US007277767B2

(12) United States Patent
Yuen et al.

(10) Patent No.: US 7,277,767 B2
(45) Date of Patent: Oct. 2, 2007

(54) SYSTEM AND METHOD FOR ENHANCED STREAMING AUDIO

(75) Inventors: Thomas C. K. Yuen, Newport Beach, CA (US); Alan D. Kraemer, Tustin, CA (US); Charles R. Cortright, Jr., Corona Del Mar, CA (US); Jeffrey M. Claar, Tustin Ranch, CA (US)

(73) Assignee: SRS Labs, Inc., Santa Ana, CA (US)

( * ) Notice: Subject to any disclaimer, the term of this patent is extended or adjusted under 35 U.S.C. 154(b) by 1131 days.

(21) Appl. No.: 09/734,475

(22) Filed: Dec. 11, 2000

(65) Prior Publication Data

US 2002/0129151 A1 Sep. 12, 2002

Related U.S. Application Data

(60) Provisional application No. 60/170,144, filed on Dec. 10, 1999, provisional application No. 60/170,143, filed on Dec. 10, 1999.

(51) Int. Cl.
*G06F 17/00* (2006.01)
*G06F 15/16* (2006.01)

(52) U.S. Cl. ........................................ 700/94; 709/231

(58) Field of Classification Search .................... 381/1, 381/119, 20, 22, 310, 80; 700/94; 704/500, 704/501; 709/217, 219, 231
See application file for complete search history.

(56) References Cited

U.S. PATENT DOCUMENTS 3,170,991 A 2/1965 Glasgal
3,229,038 A 1/1966 Richter
3,246,081 A 4/1966 Edwards (Continued)

FOREIGN PATENT DOCUMENTS

DE 33 31 352 A1 3/1985

(Continued)

OTHER PUBLICATIONS

Davies, Jeff and Bohn, Dennis "Squeeze Me, Stretch Me: the DC 24 Users Guide" Rane Note 130 [online]. Rane Corporation. 1993 [retrieved Apr. 26, 2005] Retrieved from the Internet: <URL: http://www.rane.com/pdf/note130.pdf>. pp. 2-3.

*Primary Examiner*—Sinh Tran
*Assistant Examiner*—Andrew C Flanders
(74) *Attorney, Agent, or Firm*—Knobbe Martens Olson & Bear LLP

(57) ABSTRACT

A system and method for enhancement and management of streaming audio is disclosed. In one embodiment, the system provides a client-side decoder that is compatible with numerous audio formats, so that a user can enjoy relatively high-quality audio from various sources, even from sources that do not provide multi-channel or high-quality audio data. The system and method also include a management system for managing and controlling the use of licensed signal processing software to further enhance an audio stream. In one embodiment, the management system is used to manage a signal processing module that provides psychoacoustic audio processing to create a wider soundstage, an acoustic correction process to increase the perceived height and clarity of the audio image, and bass enhancement processing to create the perception of low bass from the small speakers or headphones typically used with multi-media systems and portable audio players.

20 Claims, 19 Drawing Sheets

U.S. PATENT DOCUMENTS

| | | | | |
|---|---|---|---|---|
| 3,249,698 | A | | 5/1966 | Van Sickle |
| 3,665,105 | A | | 5/1972 | Chowning |
| 3,697,692 | A | | 10/1972 | Hafler |
| 3,725,586 | A | | 4/1973 | Iida |
| 3,745,254 | A | | 7/1973 | Ohta et al. |
| 3,757,047 | A | | 9/1973 | Ito et al. |
| 3,761,631 | A | | 9/1973 | Ito et al. |
| 3,772,479 | A | | 11/1973 | Hilbert |
| 3,849,600 | A | | 11/1974 | Ohshima |
| 3,885,101 | A | | 5/1975 | Ito et al. |
| 3,892,624 | A | | 7/1975 | Shimada |
| 3,943,293 | A | | 3/1976 | Bailey |
| 3,970,787 | A | | 7/1976 | Searle |
| 4,024,344 | A | | 5/1977 | Dolby et al. |
| 4,063,034 | A | | 12/1977 | Peters |
| 4,069,394 | A | | 1/1978 | Doi et al. |
| 4,118,599 | A | | 10/1978 | Iwahara et al. |
| 4,139,728 | A | | 2/1979 | Haramoto et al. |
| 4,177,356 | A | | 12/1979 | Jaeger et al. |
| 4,191,852 | A | | 3/1980 | Nishikawa |
| 4,192,969 | A | | 3/1980 | Iwahara |
| 4,218,585 | A | | 8/1980 | Carver |
| 4,219,696 | A | | 8/1980 | Kogure et al. |
| 4,237,343 | A | | 12/1980 | Kurtin et al. |
| 4,239,937 | A | | 12/1980 | Kampmann |
| 4,303,800 | A | | 12/1981 | DeFreitas |
| 4,308,423 | A | | 12/1981 | Cohen |
| 4,308,424 | A | | 12/1981 | Bice, Jr |
| 4,309,570 | A | | 1/1982 | Carver |
| 4,332,979 | A | | 6/1982 | Fischer |
| 4,739,514 | A | | 4/1988 | Short et al. |
| 4,817,149 | A | | 3/1989 | Myers |
| 4,831,652 | A | | 5/1989 | Anderson et al. |
| 5,018,205 | A | | 5/1991 | Takagi et al. |
| 5,208,493 | A | | 5/1993 | Lendaro et al. |
| 5,400,405 | A | | 3/1995 | Petroff |
| 5,661,808 | A | | 8/1997 | Klayman |
| 5,771,296 | A | | 6/1998 | Unemura |
| 5,841,879 | A | * | 11/1998 | Scofield et al. ............. 381/309 |
| 5,872,851 | A | | 2/1999 | Petroff |
| 5,892,830 | A | | 4/1999 | Klayman |
| 5,912,976 | A | | 6/1999 | Klayman |
| 5,999,630 | A | | 12/1999 | Iwamatsu |
| 6,134,330 | A | | 10/2000 | De Poortere et al. |
| 6,647,389 | B1 | * | 11/2003 | Fitch et al. ................... 707/10 |
| 6,694,027 | B1 | * | 2/2004 | Schneider .................... 381/20 |
| 6,766,305 | B1 | * | 7/2004 | Fucarile et al. ............... 705/51 |

FOREIGN PATENT DOCUMENTS

| | | | | |
|---|---|---|---|---|
| EP | 0 097 982 | A3 | | 6/1983 |
| EP | 0 320 270 | A2 | | 12/1988 |
| EP | 0 354 517 | A2 | | 8/1989 |
| EP | 0 357 402 | A2 | | 8/1989 |
| EP | 0 367 569 | A2 | | 10/1989 |
| EP | 0 526 880 | A2 | | 8/1992 |
| EP | 0 637 191 | A2 | | 7/1994 |
| EP | 0 699 012 | A2 | | 6/1995 |
| EP | 756437 | A2 | * | 1/1997 |
| GB | 2 154 835 | A | | 2/1985 |
| JP | 40-29936 | | | 9/1961 |
| JP | 43-12585 | | | 12/1965 |
| JP | 58-144989 | | | 3/1982 |
| JP | 59-27692 | | | 8/1982 |
| JP | 58146200 | | | 8/1983 |
| JP | 81-33600 | | | 7/1984 |
| JP | 61-166696 | | | 4/1985 |
| JP | 05300596 | | | 11/1993 |
| JP | 09224300 | | | 8/1997 |
| WO | WO87/06090 | | | 1/1987 |
| WO | WO91/19407 | | | 6/1991 |
| WO | WO94/16538 | | | 7/1994 |
| WO | WO96/34509 | | | 4/1996 |
| WO | WO9820709 | A1 | * | 5/1998 |

* cited by examiner

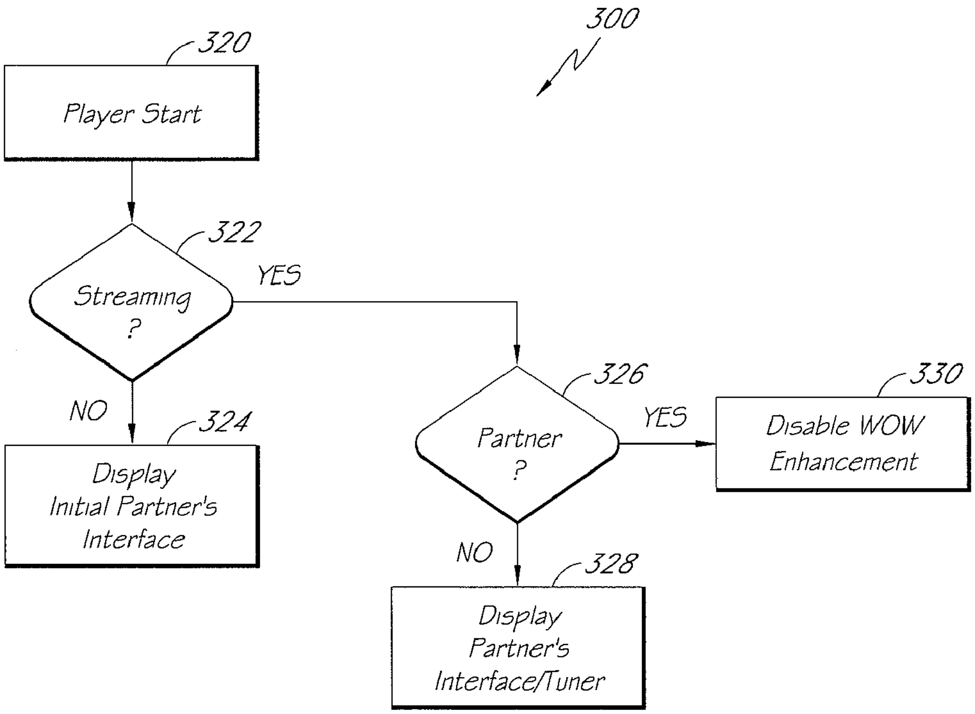
FIG. 3

SYSTEM AND METHOD FOR ENHANCED STREAMING AUDIO

REFERENCE TO RELATED APPLICATIONS

The present application claims priority benefit of U.S. Provisional Application No. 60/170,144, filed Dec. 10, 1999, titled "SURROUND SOUND ENHANCEMENT OF INTERNET AUDIO STREAMS," and U.S. Provisional Application No. 60/170,143, filed Dec. 10, 1999, titled "CLIENT SIDE IMPLEMENTATION AND MANAGEMENT TO INTERNET MUSIC AND VOICE STREAM ENHANCEMENT." The disclosure of both provisional applications are hereby included by reference in their entirety.

BACKGROUND OF THE INVENTION

1. Field of the Invention

The present invention relates to techniques to enhance the quality of streaming audio, and techniques to manage such enhancements.

2. Description of the Related Art

Currently, streaming of audio via the Internet is beginning to overtake radio in popularity as a method for distributing information and entertainment. At present, the formats used for Internet-based distribution of audio are limited to single-channel monaural and conventional two-channel stereo. Efficient transmission usually requires the audio signal to be highly compressed to accommodate the limited bandwidth available. For this reason the received audio is often of mediocre or poor quality.

Due to bandwidth limitations it is difficult to transmit more than two channels of audio in real time via the Internet while maintaining audio integrity. In order to effectively transmit more than two channels of audio over the Internet, multi-channel audio (typically meaning audio sources having two stereo channels plus one or more surround channels) must be encoded or otherwise represented by the two channels being transmitted. The two channels may then be converted into a data stream for Internet delivery using one of many Internet compression schemes (e.g., mp3, etc). Systems that permit transmission of multi-channel audio over traditional two-channel transmission media have significant limitations, which make them unsuitable for Internet transmission of encoded multi-channel audio. For example, systems such as Dolby Surround/ProLogic are limited by: (i) their source compatibility requirements, making the audio delivery technique dependent upon a particular encoding or decoding scheme; (ii) the number of channels available in the multi-channel format that can be represented by the two channels; and (iii) in the audio quality of the surround channels. Additionally, existing digital transmission and recording systems such as DTS and AC3 require too much bandwidth to operate effectively in the Internet environment.

SUMMARY OF THE INVENTION

The present invention solves these and other problems by enhancing the entertainment value of Internet audio through the use of client-side decoders that are compatible with a wide variety of formats, enhancement of the audio stream (either client-side, server-side, or both), and distribution and management of such enhancements.

In one embodiment, a Circle Surround decoder is used to decode audio streams from an audio source. If a multi-channel speaker system (having more than two speakers) is available, then the decoded 5.1 sound can be provided to the multi-channel speaker system. Alternatively, if a pair of stereo speakers is available, the decoded data can be provided to a second signal-processing module for further processing. In one embodiment, the second signal-processing module includes an SRS Laboratories "TruSurround" virtualization software module to allow multi-channel sound to be produced by the stereo speakers. In one embodiment, the second signal-processing module includes an SRS Laboratories "WOW" enhancement module to provide further sound enhancement.

In one embodiment, use of a licensed signal processing software module (the licensed software) is managed by a customized browser interface. The user can download the customized browser interface from a server (e.g., a "partner server"). The partner server is typically owned by a licensed entity that has obtained distribution rights to the licensed software. The user downloads and installs the customized browser interface on his or her personal computer. When playing a local audio source (e.g., an audio file stored on the PC), the browser interface enables the licensed software so that the user can use the licensed software to provided playback enhancements to the audio file. When playing a remote file from an authorized server (i.e., from the partner server), the customized browser interface also enables the licensed software. However, when playing a remote file from an unauthorized server (i.e., from a non-partner server), the customized browser interface disables the licensed software. Thus, the customized browser interface benefits the user by allowing enhanced audio playback. The customized browser interface benefits the licensed entity by provided enhanced audio playback of audio streams from the servers managed or owned by the licensed entity. In one embodiment, the customized browser interface includes trademarks or other logos of the licensed entity, and, optionally, the licensor. The authorized servers are servers that are qualified (e.g., licensed, partnered, etc.) to provide the enhanced audio service enabled by the customized browser interface.

One embodiment includes a signal processing technique that significantly improves the image size, bass performance and dynamics of an audio system, surrounding the listener with an engaging and powerful representation of the audio performance. The sound correction system corrects for the apparent placement of the loudspeakers, the image created by the loudspeakers, and the low frequency response produced by the loudspeakers. In one embodiment, the sound correction system enhances spatial and frequency response characteristics of sound reproduced by two or more loudspeakers. The audio correction system includes an image correction module that corrects the listener-perceived vertical image of the sound reproduced by the loudspeakers, a bass enhancement module that improves the listener-perceived bass response of the loudspeakers, and an image enhancement module that enhances the listener-perceived horizontal image of the apparent sound stage.

In one embodiment, three processing techniques are used. Spatial cues responsible for positioning sound outside the boundaries of the speaker are equalized using Head Related Transfer Functions (HRTFs). These HRTF correction curves account for how the brain perceives the location of sounds to the sides of a listener even when played back through speakers in front of the listener. As a result the presentation of instruments and vocalists occur in their proper place, with the addition of indirect and reflected sounds all about the room. A second set of HRTF correction curves expands and elevates the apparent size of the stereo image, such that the sound stage takes on a scale of immense proportion compared to the speaker locations. Finally, bass performance is enhanced through a psychoacoustic technique that restores the perception of low frequency fundamental tones by dynamically augmenting harmonics that the speaker can more easily reproduce.

The corrected audio signal is enhanced to provide an expanded stereo image. In accordance with one embodiment, stereo image enhancement of a relocated audio image takes into account acoustic principles of human hearing to envelop the listener in a realistic sound stage. In loudspeakers that do not reproduce certain low-frequency sounds, the invention creates the illusion that the missing low-frequency sounds do exist. Thus, a listener perceives low frequencies, which are below the frequencies the loudspeaker can actually accurately reproduce. This illusionary effect is accomplished by exploiting, in a unique manner, how the human auditory system processes sound.

One embodiment of the invention exploits how a listener mentally perceives music or other sounds. The process of sound reproduction does not stop at the acoustic energy produced by the loudspeaker, but includes the ears, auditory nerves, brain, and thought processes of the listener. Hearing begins with the action of the ear and the auditory nerve system. The human ear may be regarded as a delicate translating system that receives acoustical vibrations, converts these vibrations into nerve impulses, and ultimately into the "sensation" or perception of sound.

In addition, with one embodiment of the invention, the small pair of loudspeakers usually used with personal computers can create a more enjoyable perception of low-frequency sounds and the perception of multi-channel (e.g., 5.1) sound.

Further, in one embodiment, the illusion of low-frequency sounds creates a heightened listening experience that increases the realism of the sound. Thus, instead of the reproduction of the muddy or wobbly low-frequency sounds existing in many low-cost prior art systems, one embodiment of the invention reproduces sounds that are perceived to be more accurate and clear.

In one embodiment, creating the illusion of low-frequency sounds requires less energy than actually reproducing the low-frequency sounds. Thus, systems which operate on batteries, low-power environments, small speakers, multimedia speakers, headphones, and the like, can create the illusion of low-frequency sounds without consuming as much valuable energy as systems which simply amplify or boost low-frequency sounds.

In one embodiment, the audio enhancement is provided by software running on a personal computer which implements the disclosed low-frequency and multi-channel enhancement techniques.

One embodiment modifies the audio information that is common to two stereo channels in a manner different from energy that is not common to the two channels. The audio information that is common to both input signals is referred to as the combined signal. In one embodiment, the enhancement system spectrally shapes the amplitude of the phase and frequencies in the combined signal in order to reduce the clipping that may result from high-amplitude input signals without removing the perception that the audio information is in stereo.

As discussed in more detail below, one embodiment of the sound enhancement system spectrally shapes the combined signal with a variety of filters to create an enhanced signal. By enhancing selected frequency bands within the combined signal, the embodiment provides a perceived loudspeaker bandwidth that is wider than the actual loudspeaker bandwidth.

BRIEF DESCRIPTION OF THE DRAWINGS

The various novel features of the invention are illustrated in the figures listed below and described in the detailed description that follows.

FIG. 3 is a flowchart showing management of Internet audio stream enhancements.

In the figures, the first digit of any three-digit number generally indicates the number of the figure in which the element first appears. Where four-digit reference numbers are used, the first two digits indicate the figure number.

DETAILED DESCRIPTION

Figure 1:
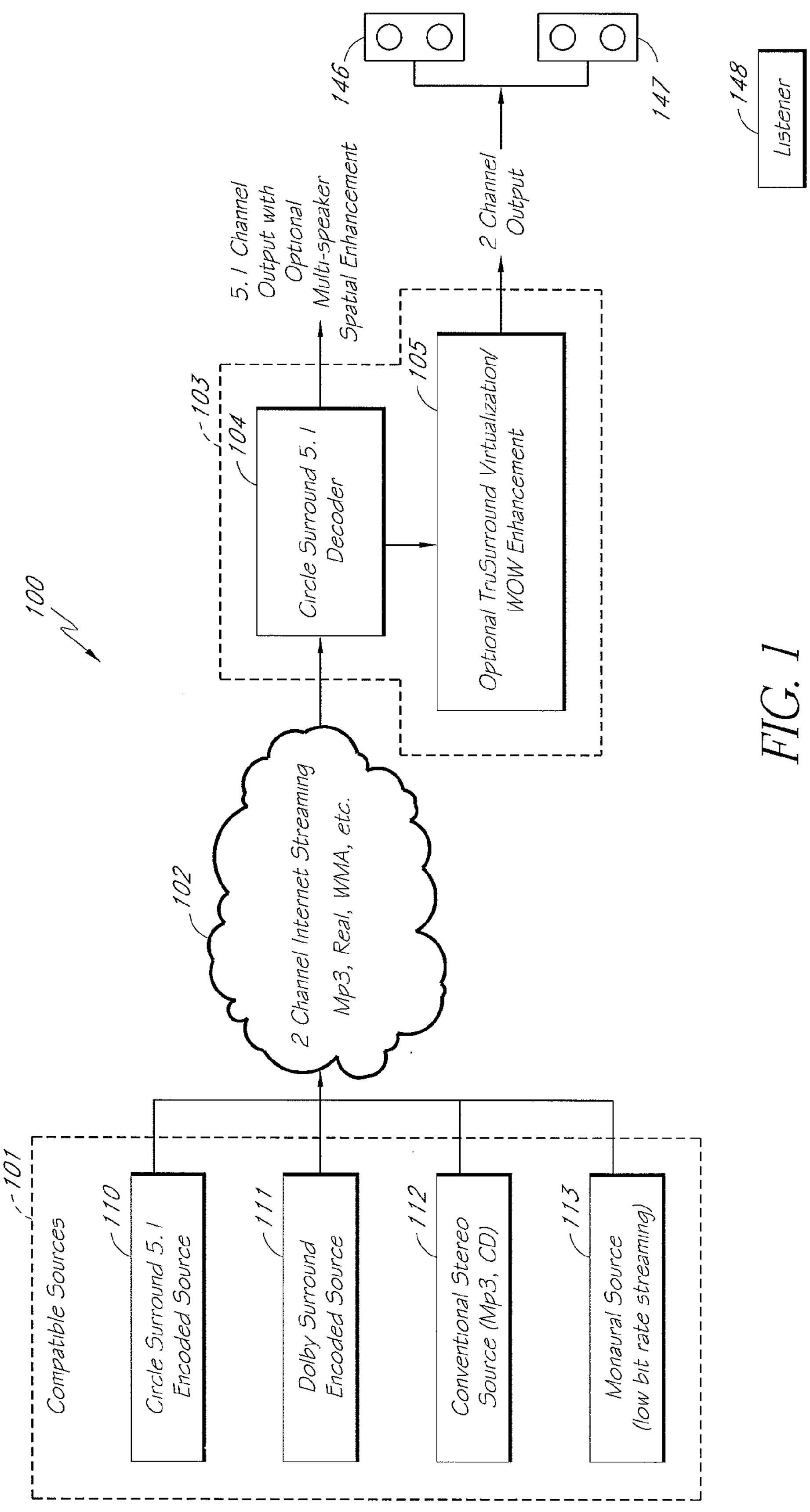
FIG. 1 is a block diagram showing compatible audio sources provided to audio decoders and signal processors in a user's computer.

FIG. 1 is a block diagram showing an audio delivery system 100 that overcomes the limitations of the prior art and provides a flexible method for streaming an encoded multi-channel audio format over the Internet. In FIG. 1, one or more audio sources 101 are provided, typically through a communication network 102, to a computer 103 operated by a listener 148. The computer 103 receives the audio data, decodes the data if necessary, and provides the audio data to one or more loudspeakers, such as, loudspeakers 146, 147, or to a multi-channel loudspeaker system (not shown). The audio sources 101 can include, for example, a Circle Surround 5.1 encoded source 110, a Dolby Surround encoded source 111, a conventional two-channel stereo source 112 (encoded as raw audio, MP3 audio, RealAudio, WMA audio, etc.), and/or a single-channel monaural source 113. In one embodiment, the computer 103 includes a decoder 104 for Circle Surround 5.1, and, optionally, an enhanced signal processing module 105 (e.g., an SRS Laboratories TruSurround system and/or an SRS Laboratories WOW system as described in connection with FIGS. 4-17). The signal processing module 105 is useful for a wide variety of systems. In particular, the signal processing module 105 incorporating TruSurround and/or WOW is particularly useful when the computer 103 is connected to the two-channel speaker system 146, 147. The signal processing module 105 incorporating TruSurround and/or WOW is also particularly useful when the speakers 146 and 147 are not optimally placed or do not provide optimal bass response.

Circle Surround 5.1 (CS 5.1) technology, as disclosed in U.S. Pat. No. 5,771,295 (the '259 patent), titled "5-2-5 MATRIX SYSTEM," which is hereby incorporated by reference in its entirety, is adaptable for use as a multi-channel Internet audio delivery technology. CS 5.1 enables the matrix encoding of 5.1 high-quality channels on two channels of audio. These two channels can then be efficiently transmitted over the Internet using any of the popular compression schemes available (Mp3, RealAudio, WMA, etc.) and received in useable form on the client side. At the client side, in the computer 103, the CS 5.1 decoder 104 is used to decode a full multi-channel audio output from the two channels streamed over the Internet. The CS 5.1 system is referred to as a 5-2-5 system in the '259 patent because five channels are encoded into two channels, and then the two channels are decoded back into five channels. The "5.1" designation, as used in "CS 5.1," typically refers to the five channels (e.g., left, right, center, left-rear (also known as left-surround), right-rear (also known as right-surround)) and an optional subwoofer channel derived from the five channels.

Although the '259 patent describes the CS 5.1 system using hardware terminology and diagrams, one of ordinary skill in the art will recognize that a hardware-oriented description of signal processing systems, even signal processing systems intended to be implemented in software, is common in the art, convenient, and efficiently provides a clear disclosure of the signal processing algorithms. One of ordinary skill in the art will recognize that the CS 5.1 system described in the '259 patent can be implement in software by using digital signal processing algorithms that mimic the operation of the described hardware.

Use of CS 5.1 technology to stream multi-channel audio signals creates a backwardly compatible, fully upgradable Internet audio delivery system. For example, because the CS 5.1 decoding system 104 can create a multi-channel output from any audio source in the group 101, the original format of the audio signal prior to streaming can include a wide variety of encoded and non-encoded source formats including the Dolby Surround source 111, the conventional stereo source 112, or the monaural source 113. This creates a seamless architecture for both the website developer performing Internet audio streaming and the listener 148 receiving the audio signals over the Internet. If the website developer wants an even higher quality audio experience at the client side, the audio source can first be encoded with CS 5.1 prior to streaming (as in the source 110). The CS 5.1 decoding system 104 can then generate 5.1 channels of full bandwidth audio providing an optimal audio experience.

The surround channels that are derived from the CS 5.1 decoder 104 are of higher quality as compared to other available systems. While the bandwidth of the surround channels in a Dolby ProLogic system is limited to 7 Khz monaural, CS 5.1 provides stereo surround channels that are limited only by the bandwidth of the transmission media.

The disclosed Internet delivery system 100 is also compatible with client-side systems 103 that are not equipped for multi-channel audio output. For two-channel output (e.g., using the loudspeakers 146,147), a virtualization technology can be used to combine the multi-channel audio signals for playback on a two-speaker system without loss of surround sound effects. In one embodiment, "TruSurround" multi-channel virtualization technology, as disclosed in U.S. Pat. No. 5,912,976, incorporated herein by reference in its entirety, is used on the Client side to present the decoded surround information in a two-channel, two-speaker format. In addition, the signal processing techniques disclosed in U.S. Pat. Nos. 5,661,808 and 5,892,830, both of which are incorporated herein by reference, can be used on both the client and server side to spatially enhance multi-channel, multi-speaker implementations. In one embodiment, the WOW technology can be used in the computer 103 or server-side to enhance the spatial and bass characteristics of the streamed audio signal. The WOW technology, as is disclosed herein in connection with FIGS. 4-17 and in U.S. Pat. application Ser. No. 09/411,143, titled "ACOUSTIC CORRECTION APPARATUS," which is hereby incorporated by reference in its entirety.

Use of the Internet multi-channel audio delivery system 100 as disclosed herein solves the problem of limited bandwidth for delivering quality surround sound over the Internet. Moreover, the system can be deployed in a segmented fashion either at the client side, the server side, or both, thereby reducing compatibility problems and allowing for various levels of sound enrichment. This combination of wide source compatibility, flexible transmission requirements, high surround quality and additional audio enhancements, such as WOW, uniquely solves the issues and problems of streaming audio over the Internet.

Due to the highly compressed nature of Internet music streams, the quality of the received audio can be very poor. Through the use of "WOW" technology, and other audio enhancement technologies, the perceived quality of music transmitted and distributed over the Internet can be significantly improved.

Figure 4:
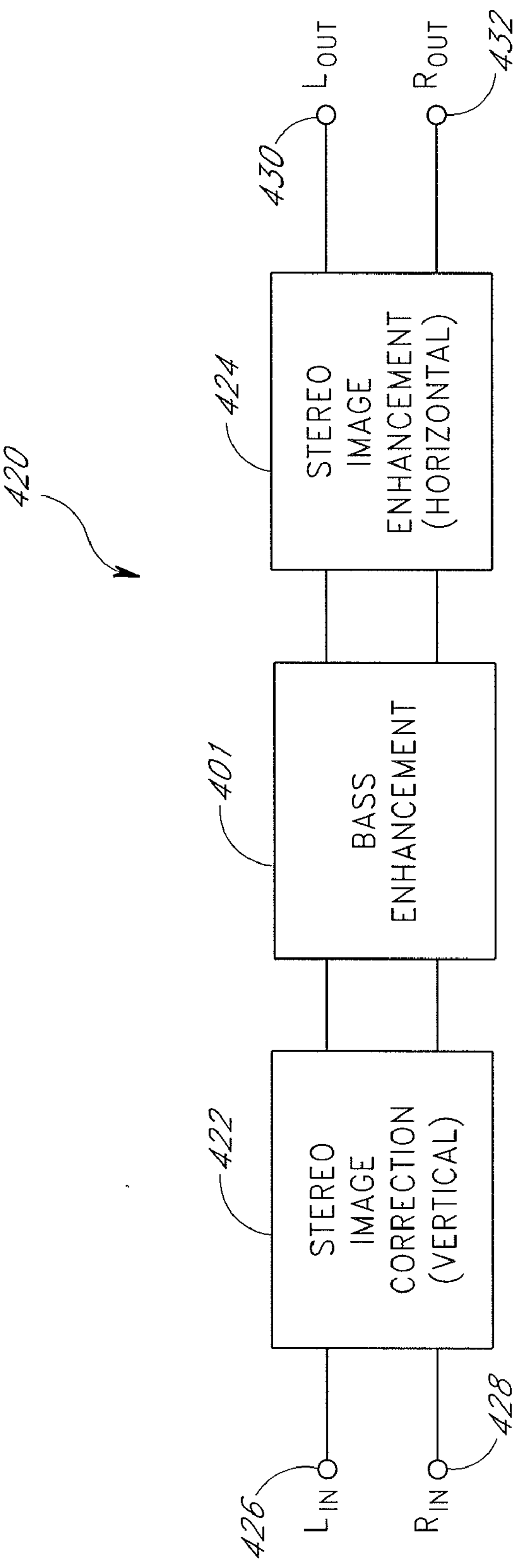
FIG. 4 is a block diagram of a WOW signal processing system that includes a stereo image correction module operatively connected to a stereo enhancement module and a bass enhancement system for creating a realistic stereo image from a pair of input stereo signals.

The WOW technology (as shown in FIG. 4) combines three processes: (1) psychoacoustic audio processing to create a wider soundstage, (2) an acoustic correction process to increase the perceived height and clarity of the audio image, and (3) bass enhancement processing to create the perception of low bass from the small speakers or headphones typically used with multi-media systems and portable audio players. The WOW combination of technologies has been found to be uniquely suited to compensating for the quality limitations of highly compressed audio.

Licensing and Management of the Enhancement Process

Although FIG. 1 shows WOW, and other audio enhancement technologies (e.g., CS 5.1, TruSurround) as being implemented on the client side (in the client computer 103), these and other enhancement technologies can also be implemented in host based (server-side signal processing) software. In one embodiment, the server-side signal processing is licensed to various Internet broadcasters to allow the broadcaster to produce enhanced Internet audio broadcasts. Such enhanced Internet audio broadcasts provide a significant market advantage regarding impact and quality of their transmissions. In one embodiment, the use of the server-side enhancement software is controlled in such a way as to provide an advantage to broadcasting partners using enhanced signal processing technology (e.g., WOW, TruSurround, CS 5.1, etc), while providing an incentive to other broadcasters to include the enhanced signal processing technology in their broadcasts.

Figure 2:
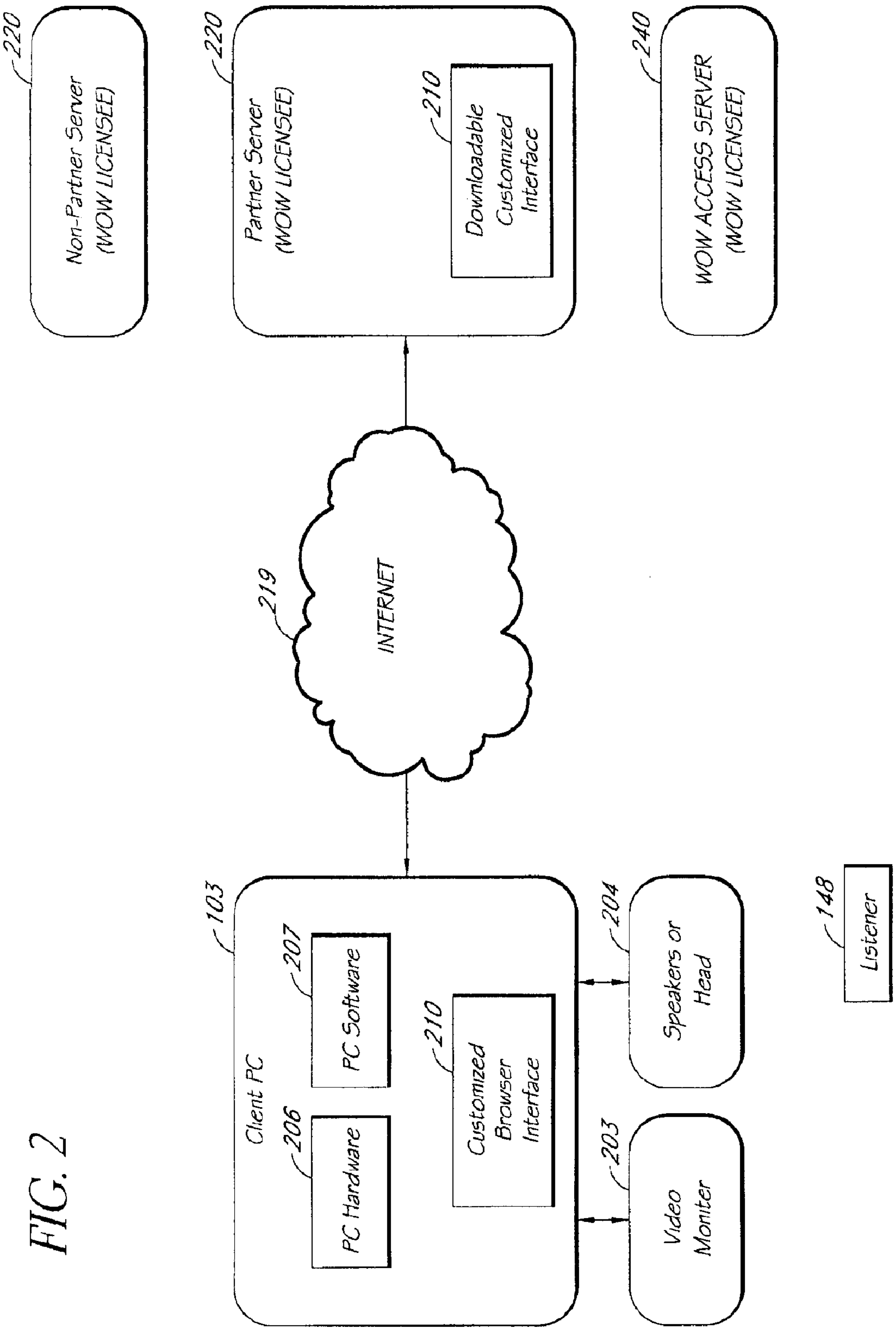
FIG. 2 is a block diagram showing interaction between a broadcast user and a broadcast partner.

FIG. 2 is a block diagram showing the computer systems used by a broadcast user and a broadcast partner. The broadcast user has a personal computer 103 (PC) system of the type ordinarily used for accessing the Internet. The broadcast user's PC system includes hardware 206, software 207 and an attached video monitor 203. The PC system 103 is connected via the Internet 219 as shown, to a server system 220 used by the broadcast partner. The broadcast partner's server 220 contains a downloadable browser interface 210, which can include enhanced signal processing technology audio processing capabilities (e.g., WOW, TruSurround, CS 5.1, etc.) or one of many other unique features. Upon accessing the server 220 (e.g., by accessing an Internet website of the broadcast partner), the user is given the option of downloading the partner's browser interface 210 and the option of including the unique processing capabilities of the browser interface 210. In one embodiment, when the user initially accesses the web site of a broadcast partner (i.e., the server 220), the user is encouraged to download an additional software application, such as a unique enhancement technology, to enhance the audio quality of the broadcast provided by the broadcast partner. In one embodiment, the browser interface 210 is disabled when the computer 103 is playing streaming audio from a non-partner server 230.

In one embodiment, the browser interface 210 also includes a customized logo, or other message, associated with the broadcast partner. Once downloaded, the browser interface 210 display the customized logo whenever streaming audio broadcasts are received from the broadcast partner's website (e.g., from the server 220). If accepted and downloaded by the user, the enhanced browser interface 210 can also reside in the broadcast user's PC 103. In one embodiment, the enhanced browser interface 210 contacts an access server 240 to determine if the server 220 is a partner server. In one embodiment, the access server is controlled by the licensor (e.g., the owner) of the audio enhancement technology provided by the enhanced browser interface 210. In one embodiment, the enhanced browser interface 210 allows the listener 148 to turn audio enhancement (e.g., WOW, CS 5.1, TruSurround, etc.) on and off, and it allows the listener 148 to control the operation of the audio enhancement.

As part of an Internet audio enhancement system, the enhanced signal processing technology can be used as an integral part of the browser-controlled user interface 210 that can be dynamically customized by the broadcast partner. In one embodiment, the browser partner dynamically customizes the interface 210 by accessing any user that downloaded the interface and is connected to the Internet. Once accessed, the broadcast partner can modify the customized logo or any message displayed by the browser interface on the user's computer.

Since the enhancement software processing capabilities can be offered from many different websites as standalone application software, and in some cases can be offered for free, an incentive is used to persuade broadcast partners to incorporate the WOW (or other) technology in their customized browser interfaces so that market penetration or revenue generation goals are achieved.

The system disclosed herein provides a method of delivering a browser interface having audio enhancement, or other unique characteristics to a user, while still providing an incentive for additional broadcast partners to include such unique characteristics in their browsers. By way of example, the description that follows assumes that WOW technology is included in the browser interface 210 delivered over the Internet to a user. However, it can be appreciated by one of ordinary skill in the art that the invention is applicable to any audio enhancement technology, including TruSurround, CS 5.1, or any feature for that matter which may be associated with an internet browser or other downloadable piece of software.

The incentive provided to persuade broadcast partners to offer a WOW-enabled browser is the display of the broadcast partner's customized logo on the browser screens of users that download the WOW-enabled browser interface 210 from the broadcast partner. Offering WOW technology to broadcast partners allows the partners to offer a unique audio player interface to their users. The more users that download the WOW browser 210 from a broadcast partner, the more places the broadcast partner's logo is displayed. Once WOW technology has been downloaded, it can automatically display a browser-based interface, customized by the partner. This interface can either simply provide user control of WOW or integrate full stream access and playback controls in addition to the WOW controls.

The operation and management of the browser-based interface 210 including WOW and the partner's customized logo is described in connection with the flowchart 300 of FIG. 3. The flowchart of FIG. 3 describes the operations after a user has already downloaded the WOW-enabled browser interface 210 from a broadcast partner. In FIG. 3, a user begin from a start block 320 in which a software audio playback device, such as Microsoft's Media Player or the Real Player, is initiated on the user's PC 103. In one embodiment, the control software (that implements to the flowchart in FIG. 3) resides in the WOW technology initialization code, which is started when an associated media player is initiated by a user. After the start block 320, operational flow of the management system 300 enters a decision block 322 where it is determined whether audio playback is performed through Internet streaming or via a locally stored audio file on the user's PC 103. If audio playback is from a local file (e.g., one resident on the PC's hard disk, CD, etc.) then the flowchart 300 advances to a block 324 where the user is presented with a customizable local (non-browser) interface that displays the style and logo of the partner from which WOW was previously downloaded. Alternatively, if audio playback using the WOW-based player is accomplished through data streaming (e.g., from the Internet), then the process 300 advances to a decision block 326. In the decision block 326, the process determines whether the source of the data stream is a WOW broadcast partner. If the source is a broadcast partner, then control enters the state 328 where the partner's customized browser-based interface 210 is displayed on the user's video screen 203. Conversely, if the source is not a broadcast partner, then control enters a state 330 in which the WOW feature resident on the user's PC is disabled when receiving streamed data from the non-partner broadcast site. If the user reverts to playback of local files, the customized interface displaying the style and logo of the original download site is displayed.

Thus, in operation, the listener 148 selects a URL that provided a desired streaming audio program. The customized browser interface 210 sends the URL address to the WOW access server 240. In response, the WOW access server 240 sends an enable-WOW or a disable-WOW message back to the customized browser interface 210. The WOW access server 240 sends the enable-WOW message if the URL corresponds to a partner server (i.e., a WOW licensee site). The WOW access server 240 sends the disable-WOW message if the URL corresponds to a non-partner server (i.e., a site that has not licensed the WOW technology). The customized browser interface 210 receives the enable/disable message and enables or disables the client-side WOW processor accordingly. Again, it is emphasized that WOW is used in the above description by way of example, and that the above features can be used with other audio enhancement technologies including, for example, TruSurround, CS 5.1, Dolby Surround, etc.

FIG. 4 is a block diagram of a WOW acoustic correction apparatus 420 comprising, in series, a stereo image correction system 422, a bass enhancement system 401, and a stereo image enhancement system 424. The image correction system 422 provides a left stereo signal and a right stereo signal to the bass enhancement unit 401. The bass enhancement unit outputs left and right stereo signals to respective left and right inputs of the stereo image enhancement device 424. The stereo image enhancement system 424 processes the signals and provides a left output signal 430 and a right output signal 432. The output signals 430 and 432 may in turn be connected to some other form of signal conditioning system, or they may be connected directly to loudspeakers or headphones (not shown).

When connected to loudspeakers, the correction system 420 corrects for deficiencies in the placement of the loudspeakers, the image created by the loudspeakers, and the low frequency response produced by the loudspeakers. The sound correction system 420 enhances spatial and frequency response characteristics of the sound reproduced by the loudspeakers. In the audio correction system 420, the image correction module 422 corrects the listener-perceived vertical image of an apparent sound stage reproduced by the loudspeakers, the bass enhancement module 401 improves the listener-perceived bass response of the sound, and the image enhancement module 424 enhances the listener-perceived horizontal image of the apparent sound stage.

The correction apparatus 420 improves the sound reproduced by loudspeakers by compensating for deficiencies in the sound reproduction environment and deficiencies of the loudspeakers. The apparatus 420 improves reproduction of the original sound stage by compensating for the location of the loudspeakers in the reproduction environment. The sound-stage reproduction is improved in a way that enhances both the horizontal and vertical aspects of the apparent (i.e. reproduced) sound stage over the audible frequency spectrum. The apparatus 420 advantageously modifies the reverberant sounds that are easily perceived in a live sound stage such that the reverberant sounds are also perceived by the listener in the reproduction environment, even though the loudspeakers act as point sources with limited ability. The apparatus 420 also compensates for the fact that microphones often record sound differently from the way the human hearing system perceives sound. The apparatus 420 uses filters and transfer functions that mimic human hearing to correct the sounds produced by the microphone.

The sound system 420 adjusts the apparent azimuth and elevation point of a complex sound by using the characteristics of the human auditory response. The correction is used by the listener's brain to provide indications of the sound's origin. The correction apparatus 420 also corrects for loudspeakers that are placed at less than ideal conditions, such as loudspeakers that are not in the most acoustically-desirable location.

To achieve a more spatially correct response for a given sound system, the acoustic correction apparatus 420 uses certain aspects of the head-related-transfer-functions (HRTFs) in connection with frequency response shaping of the sound information to correct both the placement of the loudspeakers, to correct the apparent width and height of the sound stage, and to correct for inadequacies in the low-frequency response of the loudspeakers.

Thus, the acoustic correction apparatus 420 provides a more natural and realistic sound stage for the listener, even when the loudspeakers are placed at less than ideal locations and when the loudspeakers themselves are inadequate to properly reproduce the desired sounds.

The various sound corrections provided by the correction apparatus are provided in an order such that subsequent correction does not interfere with prior corrections. In one embodiment, the corrections are provided in a desirable order such that prior corrections provided by the apparatus 420 enhance and contribute to the subsequent corrections provided by the apparatus 420.

In one embodiment, the correction apparatus 420 simulates a surround sound system with improved bass response. The correction apparatus 420 creates the illusion that multiple loudspeakers are placed around the listener, and that audio information contained in multiple recording tracks is provided to the multiple speaker arrangement.

The acoustic correction system 420 provides a sophisticated and effective system for improving the vertical, horizontal, and spectral sound image in an imperfect reproduction environment. The image correction system 422 first corrects the vertical image produced by the loudspeakers.

Then the bass enhanced system 401 adjusts the low frequency components of the sound signal in a manner that enhances the low frequency output of small loudspeakers that do no provide adequate low frequency reproduction capabilities. Finally, the horizontal sound image is corrected by the image enhancement system 424.

The vertical image enhancement provided by the image correction system 422 typically includes some emphasis of the lower frequency portions of the sound, and thus providing vertical enhancement before the bass enhancement system 401 contributes to the overall effect of the bass enhancement processing. The bass enhancement system 401 provides some mixing of the common portions of the left and right portions of the low frequency information in a stereophonic signal (common-mode). By contrast, the horizontal image enhancement provided by the image enhancement system 424 provides enhancement and shaping of the differences between the left and right portions (differential-mode) of the signal. Thus, in the correction system 420, bass enhancement is advantageously provided before horizontal image enhancement in order to balance the common-mode and differential-mode portions of the stereophonic signal to produce a pleasing effect for the listener.

As disclosed above, the stereo image correction system 422, the bass enhancement system 401, and the stereo image enhancement system 424 cooperate to overcome acoustic deficiencies of a sound reproduction environment. The sound reproduction environments may be as large as a theater complex or as small as a portable electronic keyboard.

Figure 5A:
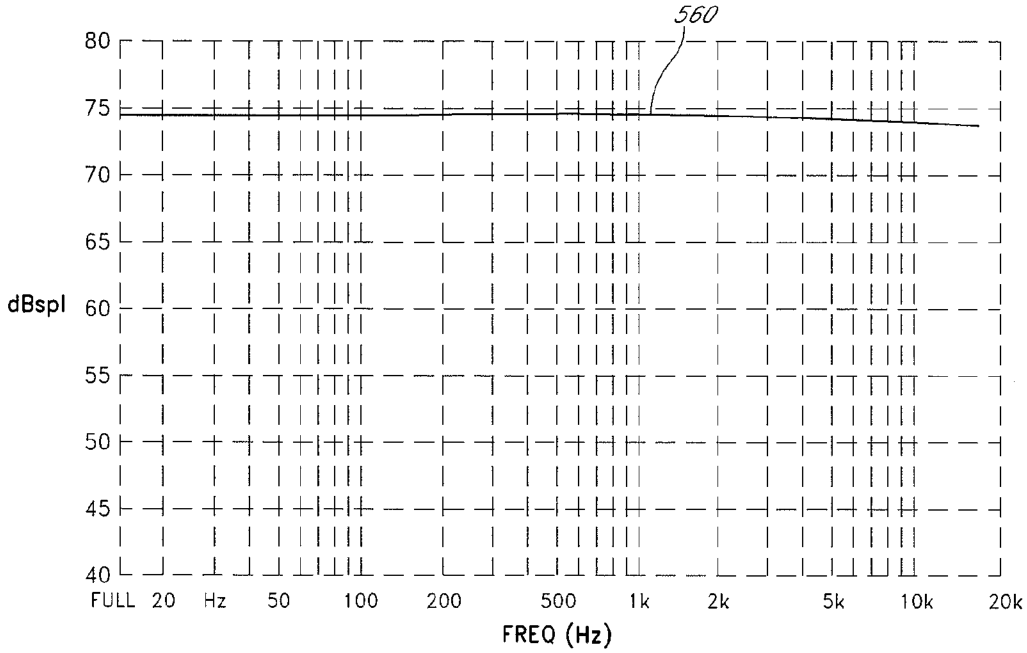
FIG. 5A is a graphical representation of a desired sound-pressure versus frequency characteristic for an audio reproduction system.

FIG. 5A depicts a graphical representation of a desired frequency response characteristic, appearing at the outer ears of a listener, within an audio reproduction environment. The curve 560 is a function of sound pressure level (SPL), measured in decibels, versus frequency. As can be seen in FIG. 5A, the sound pressure level is relatively constant for all audible frequencies. The curve 560 can be achieved from reproduction of pink noise through a pair of ideal loudspeakers placed directly in front of a listener at approximately ear level. Pink noise refers to sound delivered over the audio frequency spectrum having equal energy per octave. In practice, the flat frequency response of the curve 560 may fluctuate in response to inherent acoustic limitations of speaker systems.

The curve 560 represents the sound pressure levels that exist before processing by the ear of a listener. The flat frequency response represented by the curve 560 is consistent with sound emanating towards the listener 148, when the loudspeakers are located spaced apart and generally in front of the listener 148. The human ear processes such sound, as represented by the curve 560, by applying its own auditory response to the sound signals. This human auditory response is dictated by the outer pinna and the interior canal portions of the ear.

Unfortunately, the frequency response characteristics of many home and small computer sound reproduction systems do not provide the desired characteristic shown in FIG. 5A. On the contrary, loudspeakers may be placed in acoustically-undesirable locations to accommodate other ergonomic requirements. Sound emanating from the loudspeakers 146 and 147 may be spectrally distorted by the mere placement of the loudspeakers 146 and 147 with respect to the listener 148. Moreover, objects and surfaces in the listening environment may lead to absorption, or amplitude distortion, of the resulting sound signals. Such absorption is often prevalent among higher frequencies.

Figure 5B:
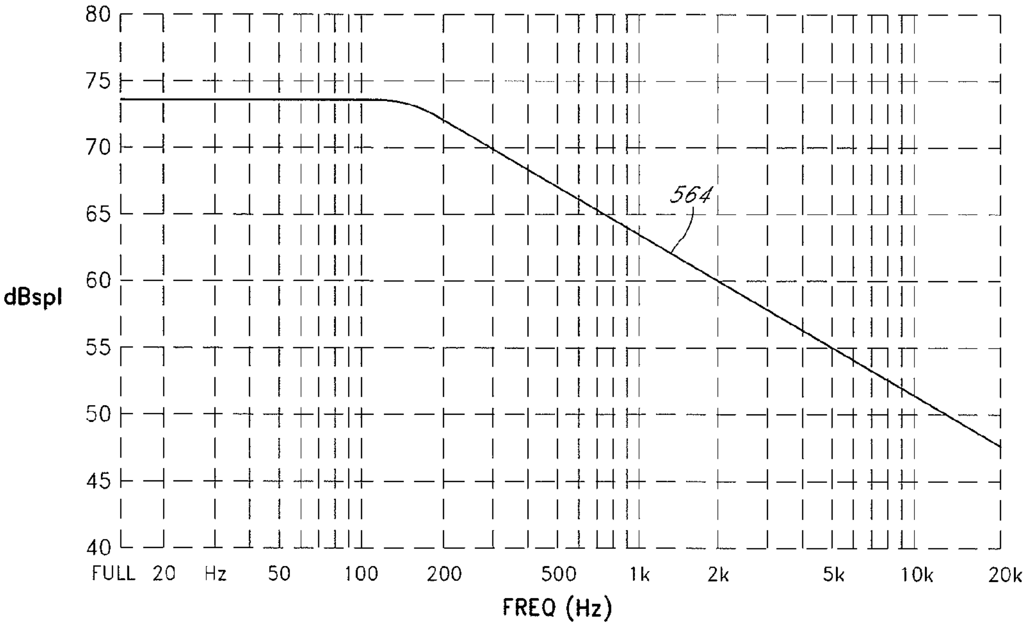
FIG. 5B is a graphical representation of a sound-pressure versus frequency characteristic corresponding to a first audio reproduction environment.
Figure 5C:
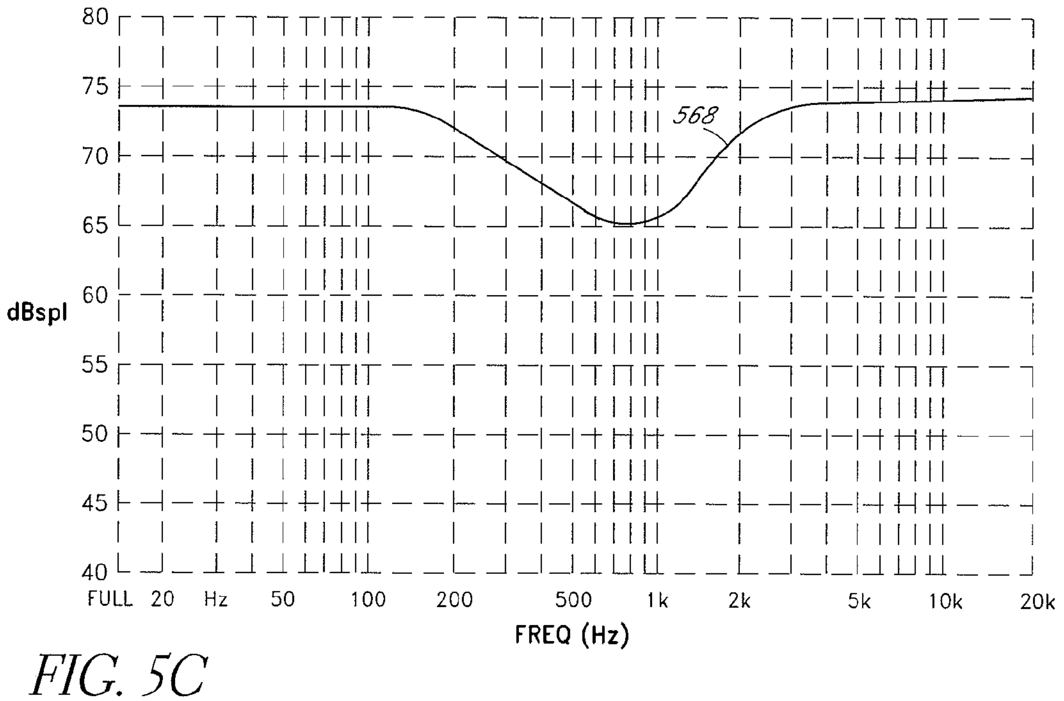
FIG. 5C is a graphical representation of a sound-pressure versus frequency characteristic corresponding to a second audio reproduction environment.
Figure 5D:
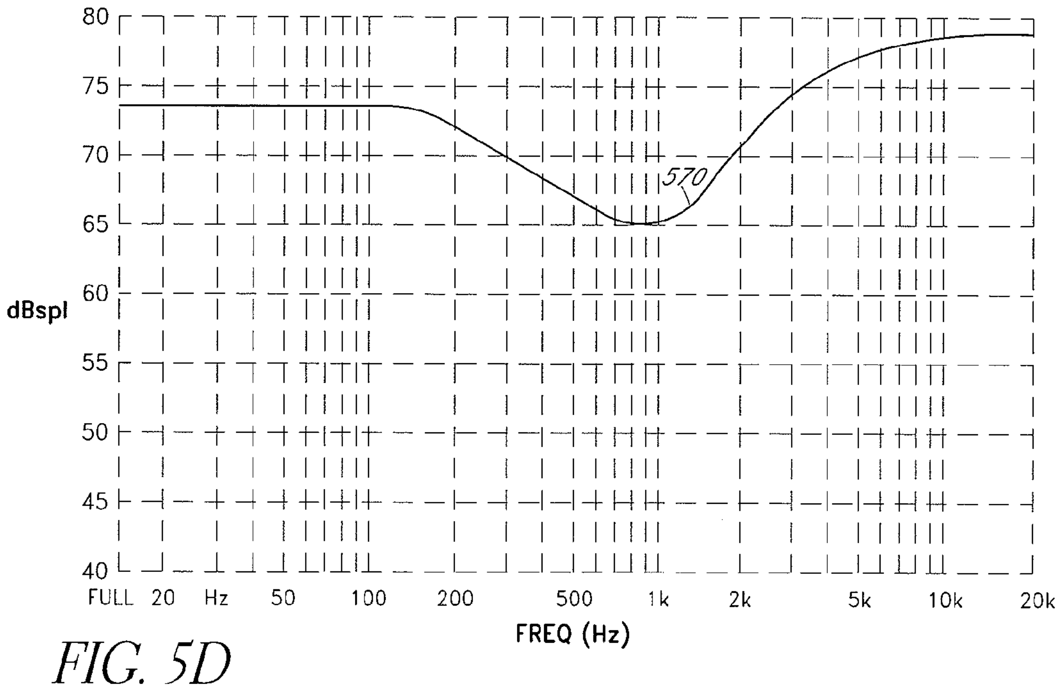
FIG. 5D is a graphical representation of a sound-pressure versus frequency characteristic corresponding to a third audio reproduction environment.

As a result of both spectral and amplitude distortion, a stereo image perceived by the listener 148 is spatially distorted providing an undesirable listening experience. FIGS. 5B-5D graphically depict levels of spatial distortion for various sound reproduction systems and listening environments. The distortion characteristics depicted in FIGS. 5B-5D represent sound pressure levels, measured in decibels, which are present near the ears of a listener.

The frequency response curve 564 of FIG. 5B has a decreasing sound-pressure level at frequencies above approximately 100 Hz. The curve 564 represents a possible sound pressure characteristic generated from loudspeakers, containing both woofers and tweeters, which are mounted below a listener. For example, assuming the loudspeakers 146, 147 contain tweeters, an audio signal played through only such loudspeakers 146, 147 might exhibit the response of FIG. 5B.

The particular slope associated with the decreasing curve 564 varies, and may not be entirely linear, depending on the listening area, the quality of the loudspeakers, and the exact positioning of the loudspeakers within the listening area. For example, a listening environment with relatively hard surfaces will be more reflective of audio signals, particularly at higher frequencies, than a listening environment with relatively soft surfaces (e.g., cloth, carpet, acoustic tile, etc). The level of spectral distortion will vary as loudspeakers are placed further from, and positioned away from, a listener.

FIG. 5C is a graphical representation of a sound-pressure versus frequency characteristic 568 wherein a first frequency range of audio signals are spectrally distorted, but a higher frequency range of the signals are not distorted. The characteristic curve 568 may be achieved from a speaker arrangement having low to mid-frequency loudspeakers placed below a listener and high-frequency loudspeakers positioned near, or at a listener's ear level. The sound image resulting from the characteristic curve 568 will have a low-frequency component positioned below the listener's ear level, and a high-frequency component positioned near the listener's ear level.

FIG. 5D is a graphical representation of a sound-pressure versus frequency characteristic 570 having a reduced sound pressure level among lower frequencies and an increasing sound pressure level among higher frequencies. The characteristic 570 is achieved from a speaker arrangement having mid to low-frequency loudspeakers placed below a listener and high-frequency loudspeakers positioned above a listener. As the curve 570 of FIG. 4D indicates, the sound pressure level at frequencies above 1000 Hz may be significantly higher than lower frequencies, creating an undesirable audio effect for a nearby listener. The sound image resulting from the characteristic curve 570 will have a low-frequency component positioned below the listener 148, and a high-frequency component positioned above the listener 148.

The audio characteristics of FIGS. 5B-5D represent various sound pressure levels obtainable in a common listening environment and heard by the listener. The audio response curves of FIGS. 5B-5D are but a few examples of how audio signals present at the ears of a listener are distorted by various audio reproduction systems. The exact level of spatial distortion at any given frequency will vary widely depending on the reproduction system and the reproduction environment. The apparent location can be generated for a speaker system defined by apparent elevation and azimuth coordinates, with respect to a fixed listener, which are different from those of actual speaker locations.

Figure 10:
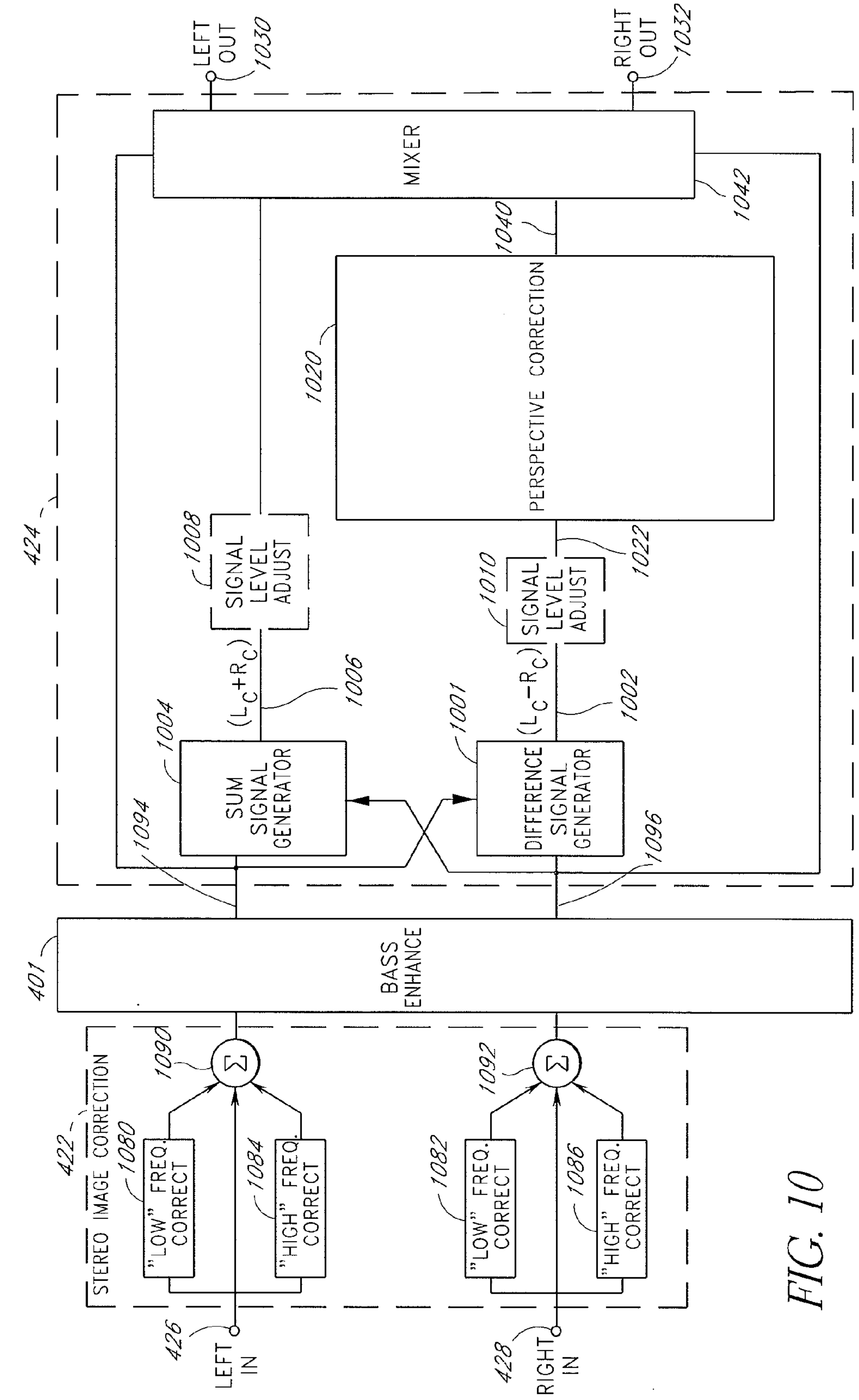
FIG. 10 is a schematic block diagram of an energy-correction system operatively connected to a stereo image enhancement system for creating a realistic stereo image from a pair of input stereo signals.

FIG. 10 is block diagram of the stereo image correction system 422, which inputs the left and right stereo signals 426 and 428. The image-correction system 422 corrects the distorted spectral densities of various sound systems by advantageously dividing the audible frequency spectrum into a first frequency component, containing relatively lower frequencies, and a second frequency component, containing relatively higher frequencies. Each of the left and right signals 426 and 428 is separately processed through corresponding low-frequency correction systems 1080, 1082, and high-frequency correction systems 1084 and 1086. It should be pointed out that in one embodiment the correction systems 1080 and 1082 will operate in a relatively "low" frequency range of approximately 100 Hz to 1000 Hz, while the correction systems 1084 and 1086 will operate in a relatively "high" frequency range of approximately 1000 Hz to 10,000 Hz. This is not to be confused with the general audio terminology wherein low frequencies represent frequencies up to 100 Hz, mid frequencies represent frequencies between 100 Hz to 4 kHz, and high frequencies represent frequencies above 4 kHz.

By separating the lower and higher frequency components of the input audio signals, corrections in sound pressure level can be made in one frequency range independent of the other. The correction systems 1080, 1082, 1084, and 1086 modify the input signals 426 and 428 to correct for spectral and amplitude distortion of the input signals upon reproduction by loudspeakers. The resultant signals, along with the original input signals 426 and 428, are combined at respective summing junctions 1090 and 1092. The corrected left stereo signal, $L_c$, and the corrected right stereo signal, $R_c$, are provided along outputs to the bass enhancement unit 401.

The corrected stereo signals provided to the bass unit 401 have a flat, i.e., uniform, frequency response appearing at the ears of the listener 148. This spatially-corrected response creates an apparent source of sound which, when played through the loudspeakers 146,147, is seemingly positioned directly in front of the listener 148.

Once the sound source is properly positioned through energy correction of the audio signal, the bass enhancement unit 101 corrects for low frequency deficiencies in the loudspeakers 146, 147 and provides bass-corrected left and right channel signals to the stereo enhancement system 424. The stereo enhancement system 424 conditions the stereo signals to broaden (horizontally) the stereo image emanating from the apparent sound source. As will be discussed in conjunction with FIGS. 8A and 8B, the stereo image enhancement system 424 can be adjusted through a stereo orientation device to compensate for the actual location of the sound source.

In one embodiment, the stereo enhancement system 424 equalizes the difference signal information present in the left and right stereo signals.

The left and right signals 1094, 1096 provided from the bass enhancement unit 401 are inputted by the enhancement system 424 and provided to a difference-signal generator 1001 and a sum signal generator 1004. A difference signal ($L_c$−$R_c$) representing the stereo content of the corrected left and right input signals, is presented at an output 1002 of the difference signal generator 1001. A sum signal, ($L_c$+$R_c$) representing the sum of the corrected left and right stereo signals is generated at an output 1006 of the sum signal generator 1004.

The sum and difference signals at outputs 1002 and 1006 are provided to optinal level-adjusting devices 1008 and 1010, respectively. The devices 1008 and 1010 are typically potentiometers or similar variable-impedance devices. Adjustment of the devices 1008 and 1010 is typically performed manually to control the base level of sum and difference signal present in the output signals. This allows a user to tailor the level and aspect of stereo enhancement according to the type of sound reproduced, and depending on the user's personal preferences. An increase in the base level of the sum signal emphasizes the audio information at a center stage positioned between a pair of loudspeakers. Conversely, an increase in the base level of difference signal emphasizes the ambient sound information creating the perception of a wider sound image. In some audio arrangements where the music type and system configuration parameters are known, or where manual adjustment is not practical, the adjustment devices 1008 and 1010 may be eliminated requiring the sum and difference-signal levels to be predetermined and fixed.

The output of the device 1010 is fed into a stereo enhancement equalizer 1020 at an input 1022. The equalizer 1020 spectrally shapes the difference signal appearing at the input 1022.

The shaped difference signal 1040 is provided to a mixer 1042, which also receives the sum signal from the device 1008. In one embodiment, the stereo signals 1094 and 1096 are also provided to the mixer 1042. All of these signals are combined within the mixer 1042 to produce an enhanced and spatially-corrected left output signal 1030 and right output signal 1032.

Although the input signals 426 and 428 typically represent corrected stereo source signals, they may also be synthetically generated from a monophonic source.

Figure 6A:
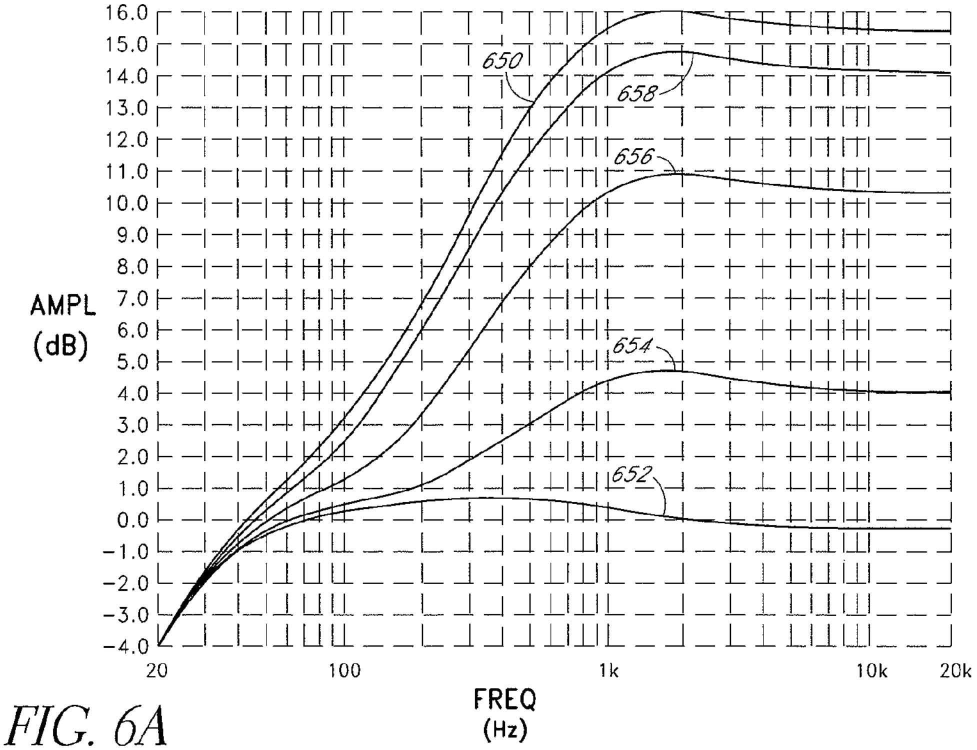
FIG. 6A is a graphical representation of the various levels of signal modification provided by a low-frequency correction system in accordance with one embodiment.
Figure 6B:
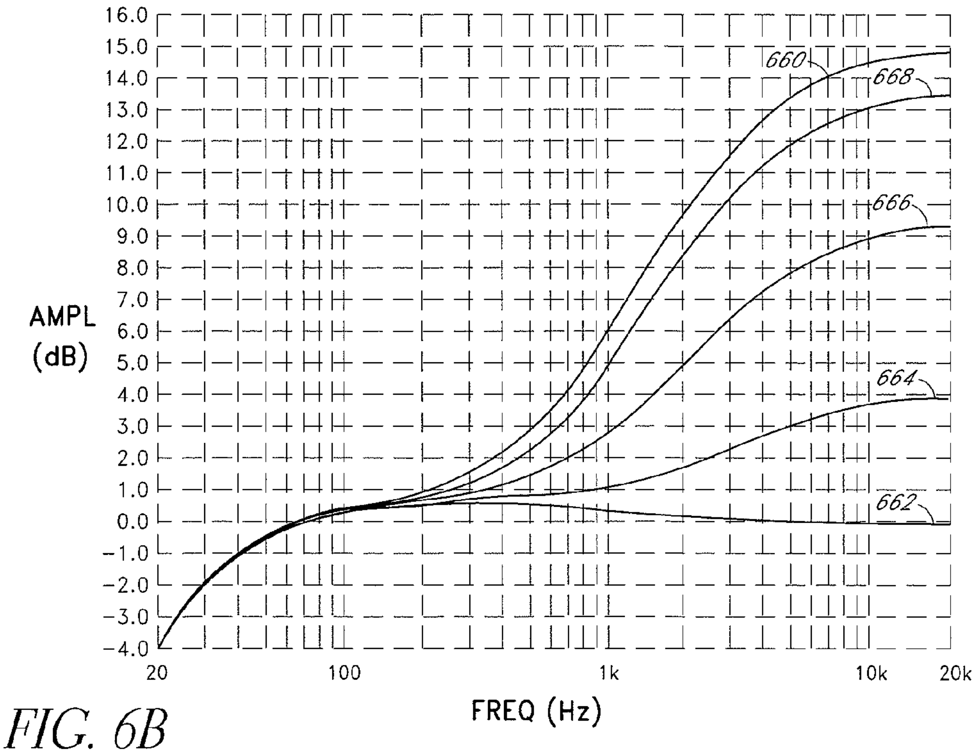
FIG. 6B is a graphical representation of the various levels of signal modification provided by a high-frequency correction system for boosting high-frequency components of an audio signal in accordance with one embodiment.
Figure 6C:
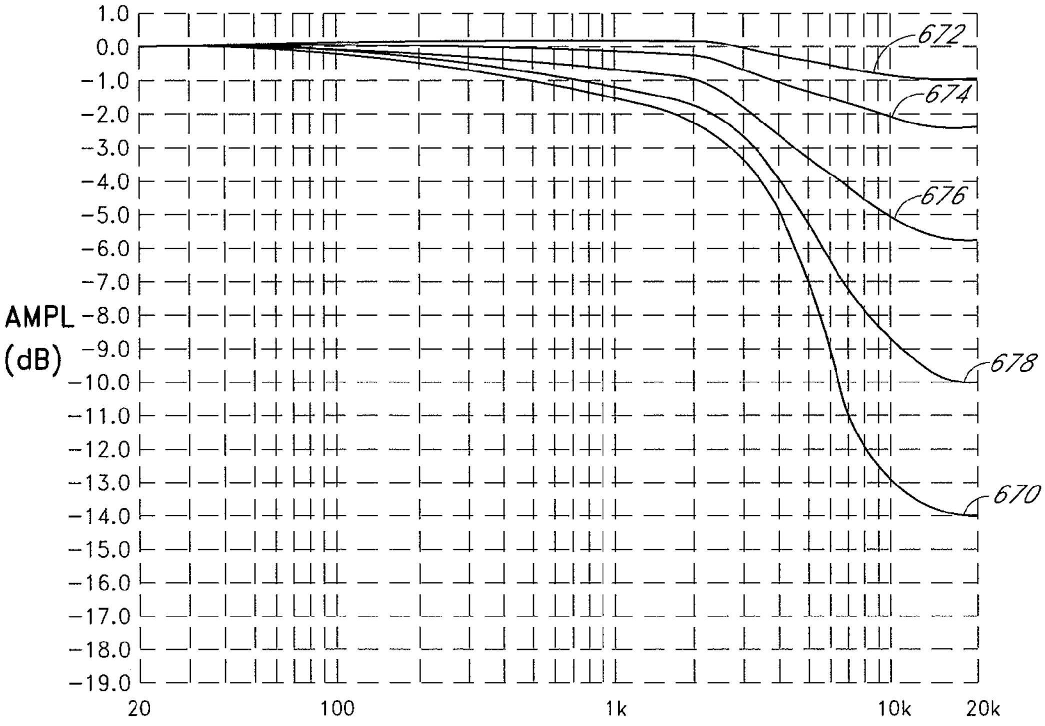
FIG. 6C is a graphical representation of the various levels of signal modification provided by a high-frequency correction system for attenuating high-frequency components of an audio signal in accordance with one embodiment.

FIGS. 6A-6C are graphical representations of the levels of spatial correction provided by "low" and "high"-frequency correction systems 1080, 1082, 1084, 1086 in order to obtain a relocated image generated from a pair of stereo signals.

Referring initially to FIG. 6A, possible levels of spatial correction provided by the correction systems 1080 and 1082 are depicted as curves having different amplitude-versus-frequency characteristics. The maximum level of correction, or boost (measured in dB), provided by the systems 1080 and 1082 is represented by a correction curve 650. The curve 650 provides an increasing level of boost within a first frequency range of approximately 100 Hz and 1000 Hz. At frequencies above 1000 Hz, the level of boost is maintained at a fairly constant level. A curve 652 represents a near-zero level of correction.

To those skilled in the art, a typical filter is usually characterized by a pass-band and stop-band of frequencies separated by a cutoff frequency. The correction curves, of FIGS. 6A-6C, although representative of typical signal filters, can be characterized by a pass-band, a stop-band, and a transition band. A filter constructed in accordance with the characteristics of FIG. 6A has a pass-band above approximately 1000 Hz, a transition-band between approximately 100 and 1000 Hz, and a stop-band below approximately 100 Hz. Filters according to FIG. 6B have pass-bands above approximately 10 kHz, transition-bands between approximately 1 kHz and 10 kHz, and a stop-band below approximately 1 kHz. Filters according to FIG. 6C have a stop-band above approximately 10 kHz, transition-bands between approximately 1 kHz and 10 kHz, and pass-bands below approximately 1 kHz. In one embodiment, the filters are first-order filters.

As can be seen in FIGS. 6A-6C, spatial correction of an audio signal by the systems 1080, 1082, 1084, and 1086 is substantially uniform within the pass-bands, but is largely frequency-dependent within the transition bands. The amount of acoustic correction applied to an audio signal can be varied as a function of frequency through adjustment of the stereo image correction system, which varies the slope of the transition bands of FIGS. 6A-6C. As a result, frequency-dependent correction is applied to a first frequency range between 100 Hz and 1000 Hz, and applied to a second frequency range of 1000 Hz to 10,000 Hz. An infinite number of correction curves are possible through independent adjustment of the correction systems 1080, 1082, 1084 and 1086.

In accordance with one embodiment, spatial correction of the higher frequency stereo-signal components occurs between approximately 1000 Hz and 10,000 Hz. Energy correction of these signal components may be positive, i.e., boosted, as depicted in FIG. 6B, or negative, i.e., attenuated, as depicted in FIG. 60. The range of boost provided by the correction systems 1084, 1086 is characterized by a maximum-boost curve 660 and a minimum-boost curve 662. Curves 664, 666, and 668 represent still other levels of boost, which may be required to spatially correct sound emanating from different sound reproduction systems. FIG. 6C depicts energy-correction curves that are essentially the inverse of those in FIG. 6B.

Figure 6D:
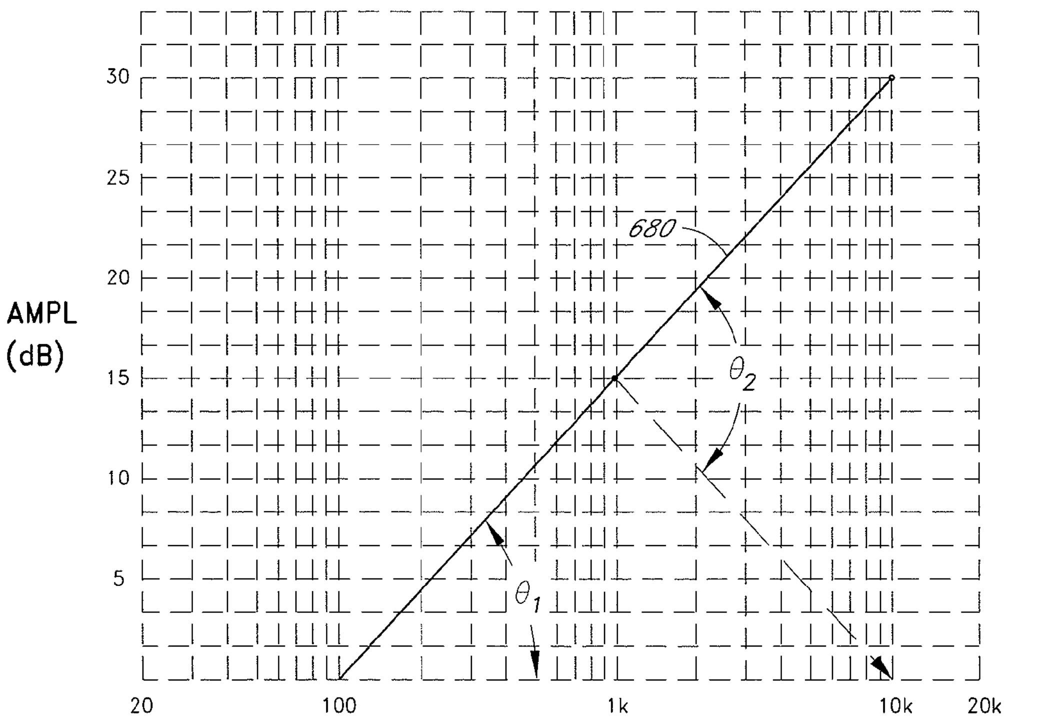
FIG. 6D is a graphical representation of a composite energy-correction curve depicting the possible ranges of sound-pressure correction for relocating a stereo image.

Since the lower frequency and higher frequency correction factors, represented by the curves of FIGS. 6A-6C, are added together, there is a wide range of possible spatial correction curves applicable between the frequencies of 100 to 10,000 Hz. FIG. 6D is a graphical representation depicting a range of composite spatial correction characteristics provided by the stereo image correction system 422. Specifically, the solid line curve 680 represents a maximum level of spatial correction comprised of the curve 650 (shown in FIG. 6A) and the curve 660 (shown in FIG. 6B). Correction of the lower frequencies may vary from the solid curve 680 through the range designated by $\theta_1$. Similarly, correction of the higher frequencies may vary from the solid curve 680 through the range designated by $\theta_2$. Accordingly, the amount of boost applied to the first frequency range of 100 Hz to 1000 Hz varies between approximately 0 and 15 dB, while the correction applied to the second frequency range of 1000 to 10,000 Hertz may vary from approximately 15 dB to 30 dB.

Figure 7:
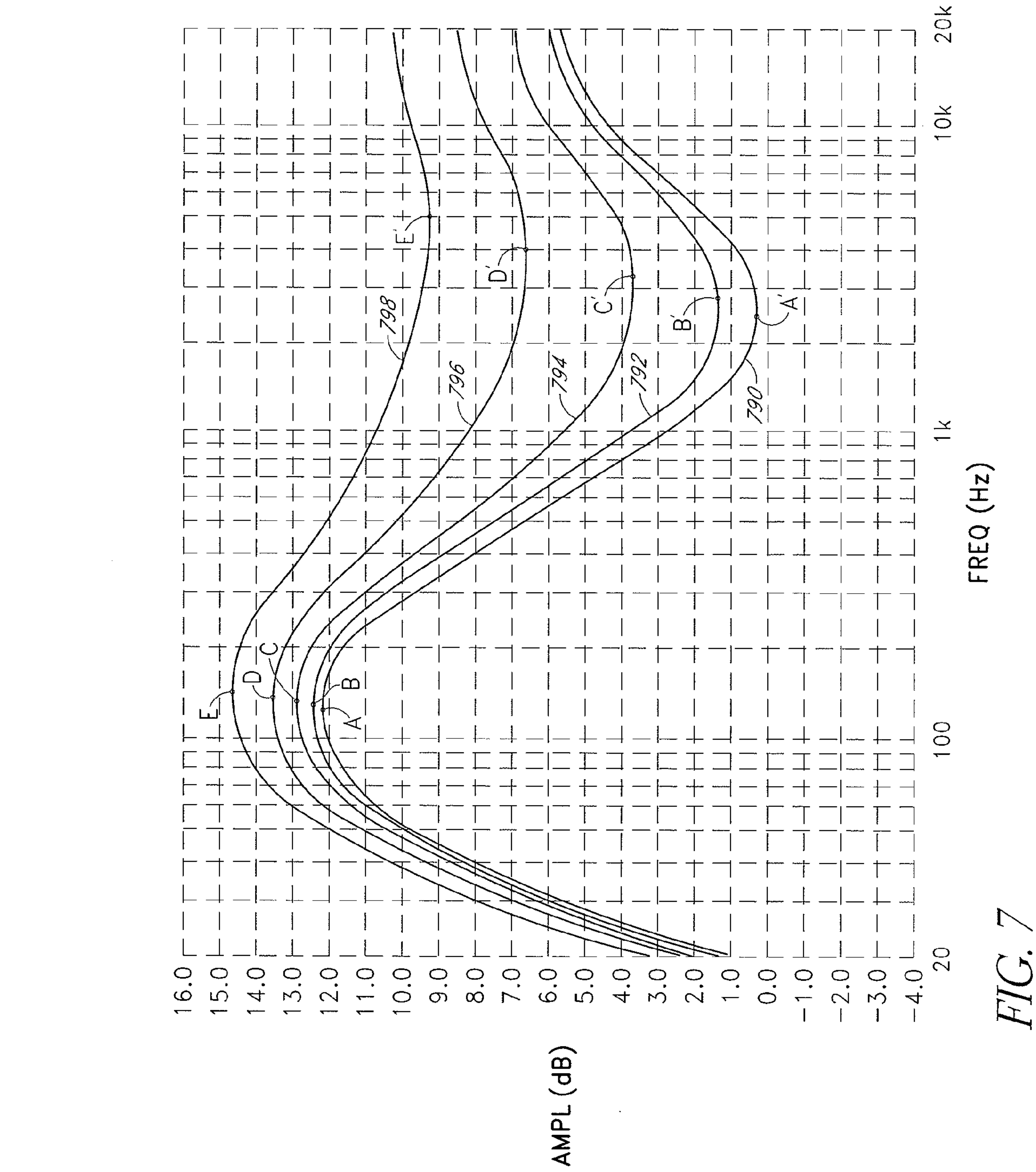
FIG. 7 is a graphical representation of various levels of equalization applied to an audio difference signal to achieve varying amounts of stereo image enhancement.

Turning now to the stereo image enhancement aspect of the present invention, a series of perspective-enhancement, or normalization curves, is graphically represented in FIG. 7. The signal $(L_c-R_c)_p$ represents the processed difference signal which has been spectrally shaped according to the frequency-response characteristics of FIG. 7. These frequency-response characteristics are applied by the equalizer 1020 depicted in FIG. 10 and are partially based upon HRTF principles.

In general, selective amplification of the difference signal enhances any ambient or reverberant sound effects which may be present in the difference signal but which are masked by more intense direct-field sounds. These ambient sounds are readily perceived in a live sound stage at the appropriate level. In a recorded performance, however, the ambient sounds are attenuated relative to a live performance. By boosting the level of difference signal derived from a pair of stereo left and right signals, a projected sound image can be broadened significantly when the image emanates from a pair of loudspeakers placed in front of a listener.

The perspective curves 790, 792, 794, 796, and 798 of FIG. 7 are displayed as a function of gain against audible frequencies displayed in log format. The different levels of equalization between the curves of FIG. 7 are required to account for various audio reproduction systems. In one embodiment, the level of difference-signal equalization is a function of the actual placement of loudspeakers relative to a listener within an audio reproduction system. The curves 790, 792, 794, 796, and 798 generally display a frequency contouring characteristic wherein lower and higher difference-signal frequencies are boosted relative to a mid-band of frequencies.

According to one embodiment, the range for the perspective curves of FIG. 7 is defined by a maximum gain of approximately 10-15 dB located at approximately 125 to 150 Hz. The maximum gain values denote a turning point for the curves of FIG. 7 whereby the slopes of the curves 790, 792, 794, 796, and 798 change from a positive value to a negative value. Such turning points are labeled as points A, B, C, D, and E in FIG. 7. The gain of the perspective curves decreases below 125 Hz at a rate of approximately 6 dB per octave. Above 125 Hz, the gain of the curves of FIG. 7 also decreases, but at variable rates, towards a minimum-gain turning point of approximately −2 to +10 dB. The minimum-gain turning points vary significantly between the curves 790, 792, 794, 796, and 798. The minimum-gain turning points are labeled as points A', B', C', D', and E', respectively. The frequencies at which the minimum-gain turning points occur varies from approximately 2.1 kHz for curve 790 to approximately 5 kHz for curve 798. The gain of the curves 790, 792, 794, 796, and 798 increases above their respective minimum-gain frequencies up to approximately 10 kHz. Above 10 khz, the gain applied by the perspective curves begins to level off. An increase in gain will continue to be applied by all of the curves, however, up to approximately 20 kHz, i.e., approximately the highest frequency audible to the human ear.

The preceding gain and frequency figures are merely design objectives and the actual figures will likely vary from system to system. Moreover, adjustment of the signal level devices 1008 and 1010 will affect the maximum and minimum gain values, as well as the gain separation between the maximum-gain frequency and the minimum-gain frequency.

Equalization of the difference signal in accordance with the curves of FIG. 7 is intended to boost the difference signal components of statistically lower intensity without overemphasizing the higher-intensity difference signal components. The higher-intensity difference signal components of a typical stereo signal are found in a mid-range of frequencies between approximately 1 kHz to 4 kHz. The human ear has a heightened sensitivity to these same mid-range of frequencies. Accordingly, the enhanced left and right output signals 1030 and 1032 produce a much improved audio effect because ambient sounds are selectively emphasized to filly encompass a listener within a reproduced sound stage.

As can be seen in FIG. 7, difference signal frequencies below 125 Hz receive a decreased amount of boost, if any, through the application of the perspective curve. This decrease is intended to avoid over-amplification of very low, i.e., bass, frequencies. With many audio reproduction systems, amplifying an audio difference signal in this low-frequency range can create an unpleasurable and unrealistic sound image having too much bass response. Examples of such audio reproduction systems include near-field or low-power audio systems, such as multimedia computer systems, as well as home stereo systems. A large draw of power in these systems may cause amplifier "clipping" during periods of high boost, or it may damage components of the audio system including the loudspeakers. Limiting the bass response of the difference signal also helps avoid these problems in most near-field audio enhancement applications.

Figure 8A:
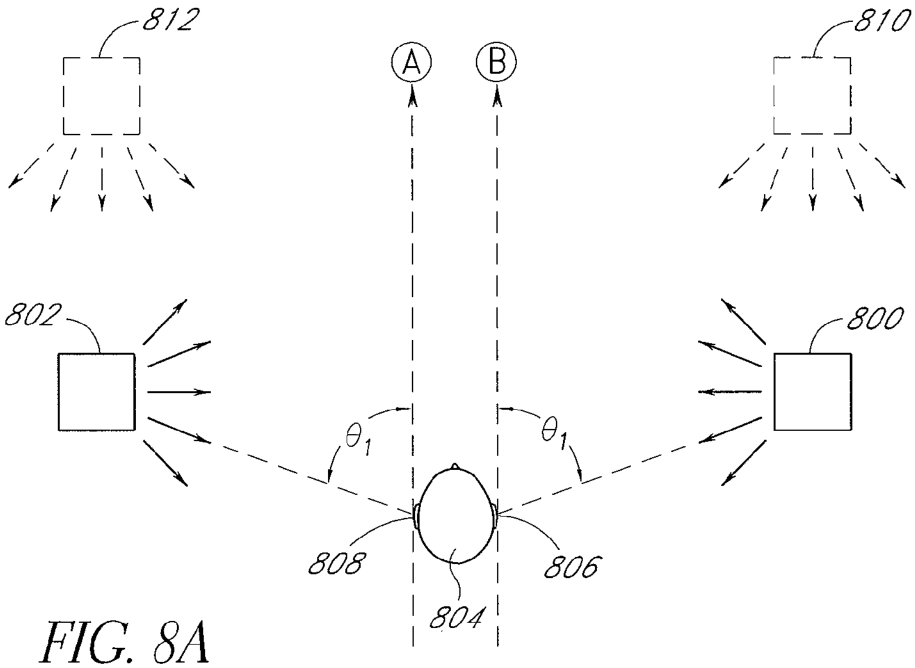
FIG. 8A is a diagram depicting the perceived and actual origins of sounds heard by a listener from loudspeakers placed at a first location.
Figure 8B:
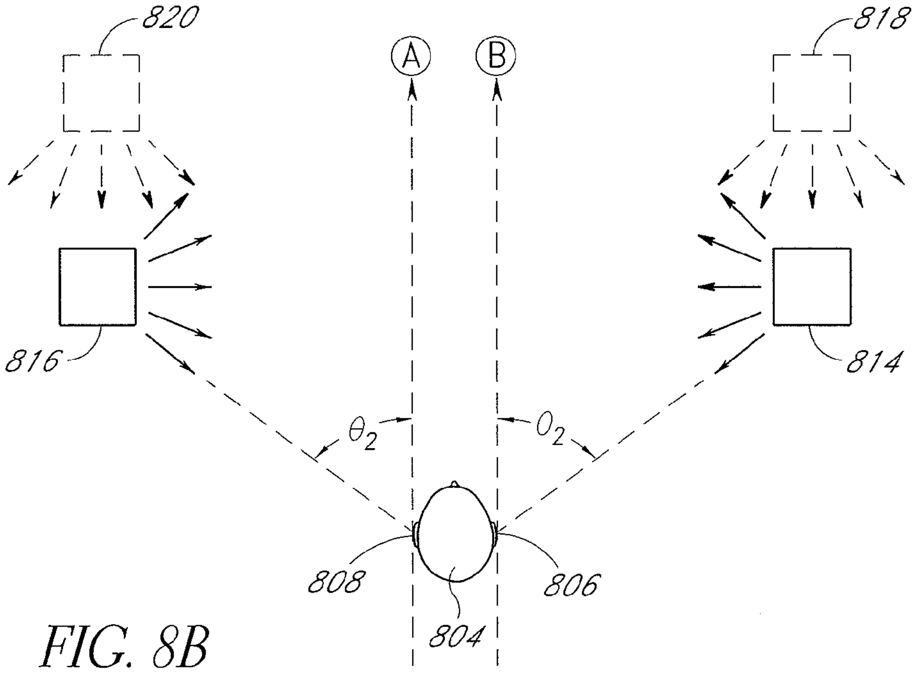
FIG. 8B is a diagram depicting the perceived and actual origins of sounds heard by a listener from loudspeakers placed at a second location.

In accordance with one embodiment, the level of difference signal equalization in an audio environment having a stationary listener is dependent upon the actual speaker types and their locations with respect to the listener. The acoustic principles underlying this determination can best be described in conjunction with FIGS. 8A and 8B. FIGS. 8A and 8B are intended to show such acoustic principles with respect to changes in azimuth of a speaker system.

FIG. 8A depicts a top view of a sound reproduction environment having loudspeakers 800 and 802 placed slightly forward of, and pointed towards, the sides of a listener 804. The loudspeakers 800 and 802 are also placed below the listener 804 at a elevational position similar to that of the loudspeakers 146, 147 shown in FIG. 2. Reference planes A and B are aligned with ears 806, 808 of the listener 804. The planes A and B are parallel to the listener's line-of-sight as shown.

The location of the loudspeakers preferably correspond to the locations of the loudspeakers 810 and 812. In one embodiment, when the loudspeakers cannot be located in a desired position, enhancement of the apparent sound image can be accomplished by selectively equalizing the difference signal, i.e., the gain of the difference signal will vary with frequency. The curve 790 of FIG. 7 represents the desired level of difference-signal equalization with actual speaker locations corresponding to the phantom loudspeakers 810 and 812.

The present invention also provides a method and system for enhancing audio signals. The sound enhancement system improves the realism of sound with a unique sound enhancement process. Generally speaking, the sound enhancement process receives two input signals, a left input signal and a right input signal, and in turn, generates two enhanced output signals, a left output signal and a right output signal.

The left and right input signals are processed collectively to provide a pair of left and right output signals. In particular, the enhanced system embodiment equalizes the differences that exist between the two input signals in a manner which broadens and enhances the perceived bandwidth of the sounds. In addition, many embodiments adjust the level of the sound that is common to both input signals so as to reduce clipping.

Although the embodiments are described herein with reference to one sound enhancement systems, the invention is not so limited, and can be used in a variety of other contexts in which it is desirable to adapt different embodiments of the sound enhancement system to different situations.

Figure 9:
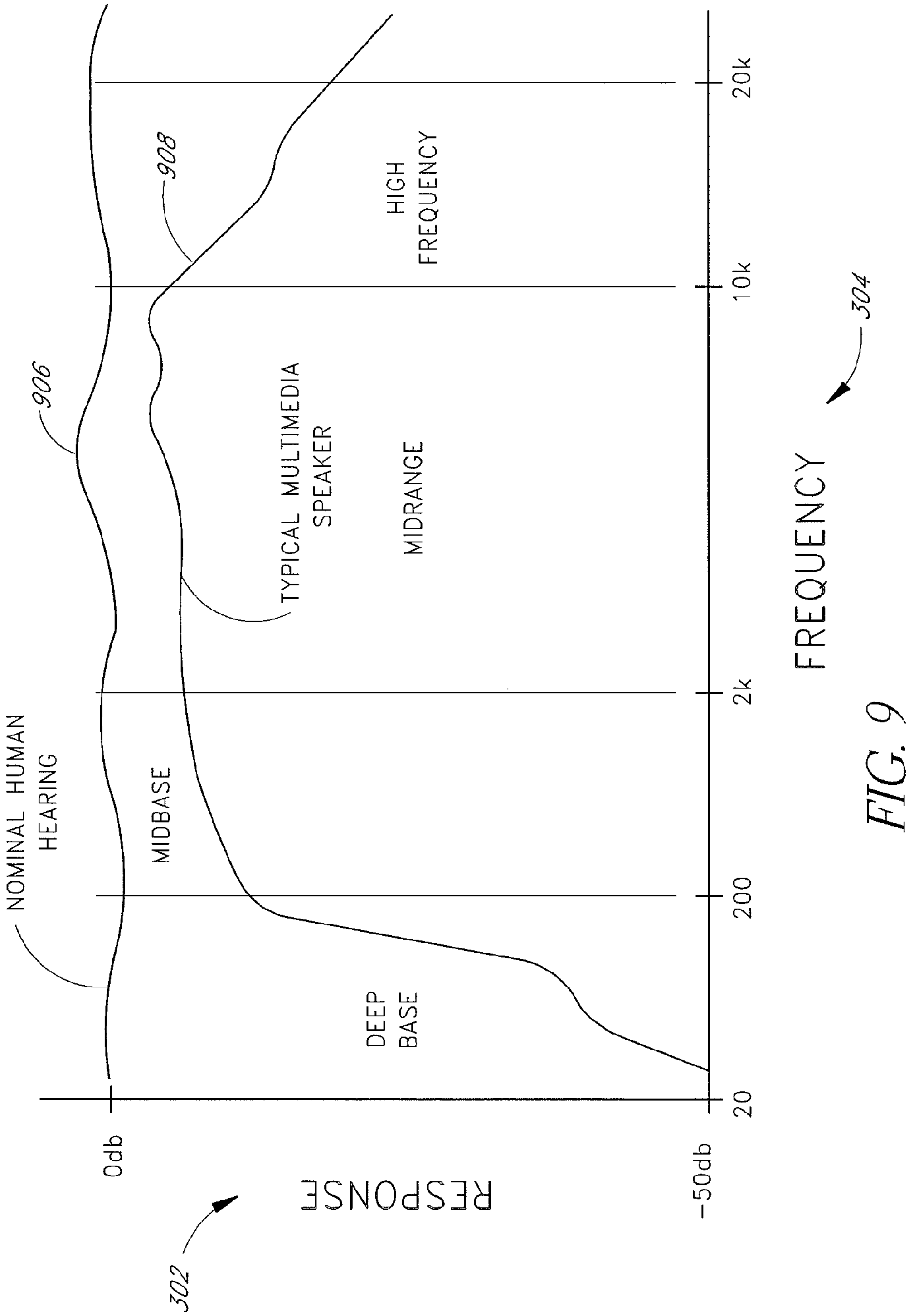
FIG. 9 is a plot of the frequency response of a typical small loudspeaker system.

A typical small loudspeaker system used for multimedia computers, automobiles, small stereophonic systems, portable stereophonic systems, headphones, and the like, will have an acoustic output response that rolls off at about 150 Hz. FIG. 9 shows a curve 906 corresponding approximately to the frequency response of the human ear. FIG. 9 also shows the measured response 908 of a typical small computer loudspeaker system that uses a high-frequency driver (tweeter) to reproduce the high frequencies, and a four-inch midrange-bass driver (woofer) to reproduce the midrange and bass frequencies. Such a system employing two drivers is often called a two-way system. Loudspeaker systems employing more than two drivers are known in the art and will work with the present invention. Loudspeaker systems with a single driver are also known and will work with the present invention. The response 908 is plotted on a rectangular plot with an X-axis showing frequencies from 20 Hz to 20 kHz. This frequency band corresponds to the range of normal human hearing. The Y-axis in FIG. 9 shows normalized amplitude response from 0 dB to −50 dB. The curve 908 is relatively flat in a midrange frequency band from approximately 2 kHz to 10 kHz, showing some roll off above 10 kHz. In the low frequency ranges, the curve 908 exhibits a low-frequency roll off that begins in a midbass band between approximately 150 Hz and 2 kHz such that below 150 Hz, the loudspeaker system produces very little acoustic output.

The location of the frequency bands shown in FIG. 9 are used by way of example and not by way of limitation. The actual frequency ranges of the deep bass band, midbass band, and midrange band vary according to the loudspeaker and the application for which the loudspeaker is used. The term deep bass is used, generally, to refer to frequencies in a band where the loudspeaker produces an output that is less accurate as compared to the loudspeaker output at higher frequencies, such as, for example, in the midbass band. The term midbass band is used, generally, to refer to frequencies above the deep bass band. The term midrange is used, generally, to refer to frequencies above the midbass band.

Many cone-type drivers are very inefficient when producing acoustic energy at low frequencies where the diameter of the cone is less than the wavelength of the acoustic sound wave. When the cone diameter is smaller than the wavelength, maintaining a uniform sound pressure level of acoustic output from the cone requires that the cone excursion be increased by a factor of four for each octave (factor of 2) that the frequency drops. The maximum allowable cone excursion of the driver is quickly reached if one attempts to improve low-frequency response by simply boosting the electrical power supplied to the driver.

Thus, the low-frequency output of a driver cannot be increased beyond a certain limit, and this explains the poor low-frequency sound quality of most small loudspeaker systems. The curve 908 is typical of most small loudspeaker systems that employ a low-frequency driver of approximately four inches in diameter. Loudspeaker systems with larger drivers will tend to produce appreciable acoustic output down to frequencies somewhat lower than those shown in the curve 908, and systems with smaller low-frequency drivers will typically not produce output as low as that shown in the curve 908.

As discussed above, to date, a system designer has had little choice when designing loudspeaker systems with extended low-frequency response. Previously known solutions were expensive and produced loudspeakers that were too large for the desktop. One popular solution to the low-frequency problem is the use of a subwoofer, which is usually placed on the floor near the computer system. Sub-woofers can provide adequate low-frequency output, but they are expensive, and thus relatively uncommon as compared to inexpensive desktop loudspeakers.

Rather than use drivers with large diameter cones, or a sub-woofer, an embodiment of the present invention overcomes the low-frequency limitations of small systems by using characteristics of the human hearing system to produce the perception of low-frequency acoustic energy, even when such energy is not produced by the loudspeaker system.

Figure 11:
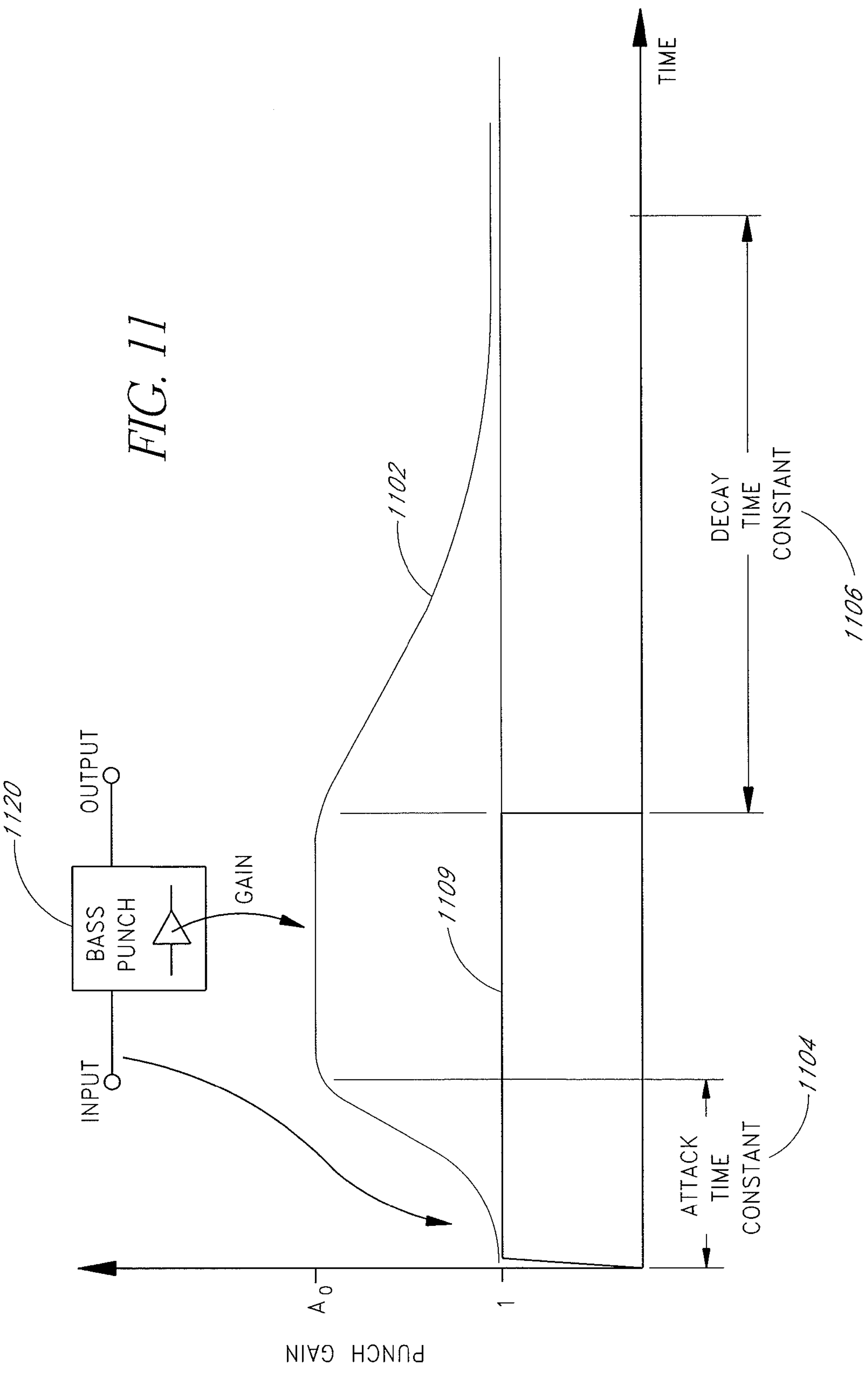
FIG. 11 is a time-domain plot showing the time-amplitude response of the punch system.

In one embodiment, the bass enhancement processor 401 uses a bass punch unit 1120, shown in FIG. 11. In one embodiment, the bass punch unit 1120 uses an Automatic Gain Control (AGC) comprising a linear amplifier with an internal servo feedback loop. The servo automatically adjusts the average amplitude of the output signal to match the average amplitude of a signal on the control input. The average amplitude of the control input is typically obtained by detecting the envelope of the control signal. The control signal may also be obtained by other methods, including, for example, lowpass filtering, bandpass filtering, peak detection, RMS averaging, mean value averaging, etc.

In response to an increase in the amplitude of the envelope of the signal provided to the input of the bass punch unit 1120, the servo loop increases the forward gain of the bass punch unit 1120. Conversely, in response to a decrease in the amplitude of the envelope of the signal provided to the input of the bass punch unit 1120, the servo loop decreases the forward gain of the bass punch unit 1120. In one embodiment, the gain of the bass punch unit 1120 increases more rapidly that the gain decreases. FIG. 11 is a time domain plot that illustrates the gain of the bass punch unit 1120 in response to a unit step input. One skilled in the art will recognize that FIG. 11 is a plot of gain as a function of time, rather than an output signal as a function of time. Most amplifiers have a gain that is fixed, so gain is rarely plotted. However, the Automatic Gain Control (AGC) in the bass punch unit 1120 varies the gain of the bass punch unit 1120 in response to the envelope of the input signal.

The unit step input is plotted as a curve 1109 and the gain is plotted as a curve 1102. In response to the leading edge of the input pulse 1109, the gain rises during a period 1104 corresponding to an attack time constant. At the end of the time period 1104, the gain 1102 reaches a steady-state gain of $A_0$. In response to the trailing edge of the input pulse 1109 the gain falls back to zero during a period corresponding to a decay time constant 1106.

Figure 12:
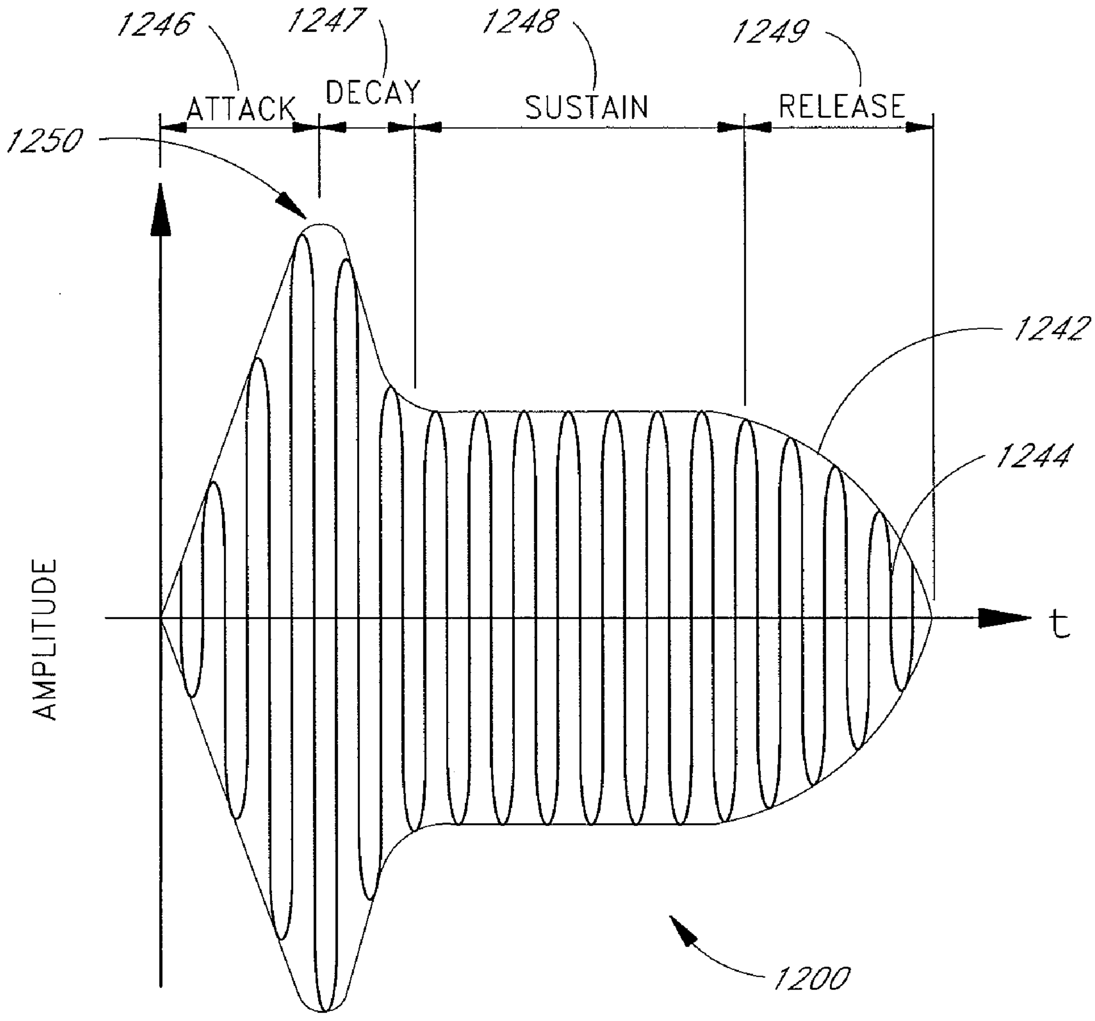
FIG. 12 is a time-domain plot showing the signal and envelope portions of a typical bass note played by an instrument, wherein the envelope shows attack, decay, sustain and release portions.

The attack time constant 1104 and the decay time constant 1106 are desirably selected to provide enhancement of the bass frequencies without overdriving other components of the system such as the amplifier and loudspeakers. FIG. 12 is a time-domain plot 1200 of a typical bass note played by a musical instrument such as a bass guitar, bass drum, synthesizer, etc. The plot 1200 shows a higher-frequency portion 1244 that is amplitude modulated by a lower-frequency portion having a modulation envelope 1242. The envelope 1242 has an attack portion 1246, followed by a decay portion 1247, followed by a sustain portion 1248, and finally, followed by a release portion 1249. The largest amplitude of the plot 1200 is at a peak 1250, which occurs at the point in time between the attack portion 1246 and the decay portion 1247.

As stated, the waveform 1244 is typical of many, if not most, musical instruments. For example, a guitar string, when pulled and released, will initially make a few large amplitude vibrations, and then settle down into a more or less steady state vibration that slowly decays over a long period. The initial large excursion vibrations of the guitar string correspond to the attack portion 1246 and the decay portion 1247. The slowly decaying vibrations correspond to the sustain portion 1248 and the release portions 1249. Piano strings operate in a similar fashion when struck by a hammer attached to a piano key.

Piano strings may have a more pronounced transition from the sustain portion 1248 to the release portion 1249, because the hammer does not return to rest on the string until the piano key is released. While the piano key is held down, during the sustain period 1248, the string vibrates freely with relatively little attenuation. When the key is released, the felt covered hammer comes to rest on the key and rapidly damps out the vibration of the string during the release period 1249.

Similarly, a drumhead, when struck, will produce an initial set of large excursion vibrations corresponding to the attack portion 1246 and the decay portion 1247. After the large excursion vibrations have died down (corresponding to the end of the decay portion 1247) the drumhead will continue to vibrate for a period of time corresponding to the sustain portion 1248 and release portion 1249. Many musical instrument sounds can be created merely by controlling the length of the periods 1246-1249.

As described in connection with FIG. 12, the amplitude of the higher-frequency signal is modulated by a lower-frequency tone (the envelope), and thus, the amplitude of the higher-frequency signal varies according to the frequency of the lower frequency tone. The non-linearity of the ear will partially demodulate the signal such that the ear will detect the low-frequency envelope of the higher-frequency signal, and thus produce the perception of the low-frequency tone, even though no actual acoustic energy was produced at the lower frequency. The detector effect can be enhanced by proper signal processing of the signals in the midbass frequency range, typically between 100 Hz -150 Hz on the low end of the range and 150 Hz -500 Hz on the high end of the range. By using the proper signal processing, it is possible to design a sound enhancement system that produces the perception of low-frequency acoustic energy, even when using loudspeakers that are incapable of producing such energy.

The perception of the actual frequencies present in the acoustic energy produced by the loudspeaker may be deemed a first order effect. The perception of additional harmonics not present in the actual acoustic frequencies, whether such harmonics are produced by intermodulation distortion or detection may be deemed a second order effect.

However, if the amplitude of the peak 1250 is too high, the loudspeakers (and possibly the power amplifier) will be overdriven. Overdriving the loudspeakers will cause a considerable distortion and may damage the loudspeakers.

The bass punch unit 1120 desirably provides enhanced bass in the midbass region while reducing the overdrive effects of the peak 1250. The attack time constant 1104 provided by the bass punch unit 1120 limits the rise time of the gain through the bass punch unit 1120. The attack time constant of the bass punch unit 1120 has relatively less effect on a waveform with a long attack period 1246 (slow envelope risetime) and relatively more effect on a waveform with a short attack period 1246 (fast envelope risetime).

An attack portion of a note played by a bass instrument (e.g., a bass guitar) will often begin with an initial pulse of relatively high amplitude. This peak may, in some cases, overdrive the amplifier or loudspeaker causing distorted sound and possibly damaging the loudspeaker or amplifier. The bass enhancement processor provides a flattening of the peaks in the bass signal while increasing the energy in the bass signal, thereby increasing the overall perception of bass.

The energy in a signal is a function of the amplitude of the signal and the duration of the signal. Stated differently, the energy is proportional to the area under the envelope of the signal. Although the initial pulse of a bass note may have a relatively large amplitude, the pulse often contains little energy because it is of short duration. Thus, the initial pulse, having little energy, often does not contribute significantly to the perception of bass. Accordingly, the initial pulse can usually be reduced in amplitude without significantly affecting the perception of bass.

Figure 13:
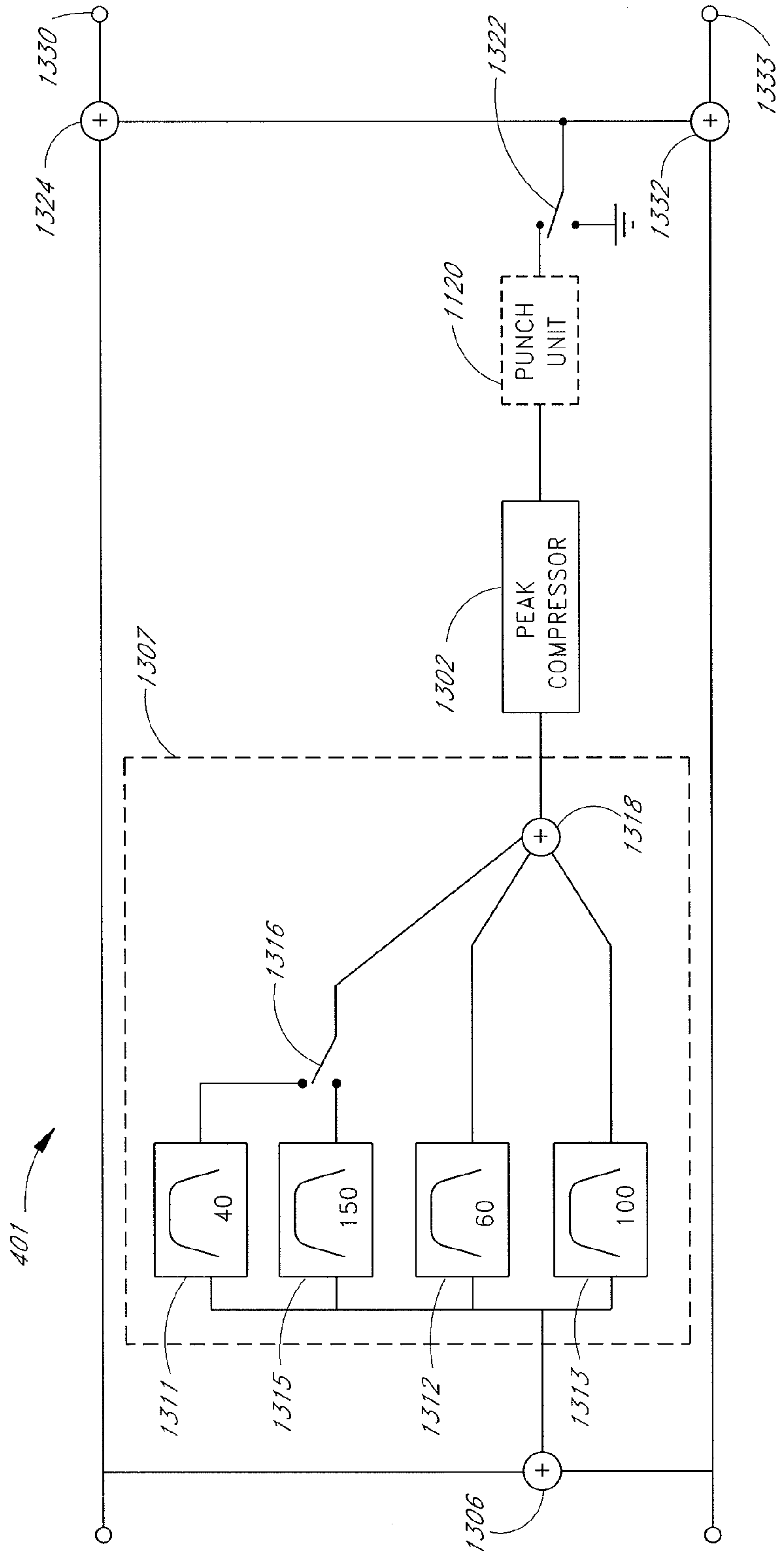
FIG. 13 is a signal processing block diagram of a system that provides bass enhancement using a peak compressor and a bass punch system.

FIG. 13 is a signal processing block diagram of the bass enhancement system 401 that provides bass enhancement using a peak compressor to control the amplitude of pulses, such as the initial pulse, bass notes. In the system 401, a peak compressor 1302 is interposed between the combiner 1318 and the punch unit 1120. The output of the combiner 1318 is provided to an input of the peak compressor 1302, and an output of the peak compressor 1302 is provided to the input of the bass punch unit 1120.

The peak compression unit 1302 "flattens" the envelope of the signal provided at its input. For input signals with a large amplitude, the apparent gain of the compression unit 1302 is reduced. For input signals with a small amplitude, the apparent gain of the compression unit 1302 is increased. Thus the compression unit reduces the peaks of the envelope of the input signal (and fills in the troughs in the envelope of the input signal). Regardless of the signal provided at the input of the compression unit 1302, the envelope (e.g., the average amplitude) of the output signal from the compression unit 1302 has a relatively uniform amplitude.

Figure 14:
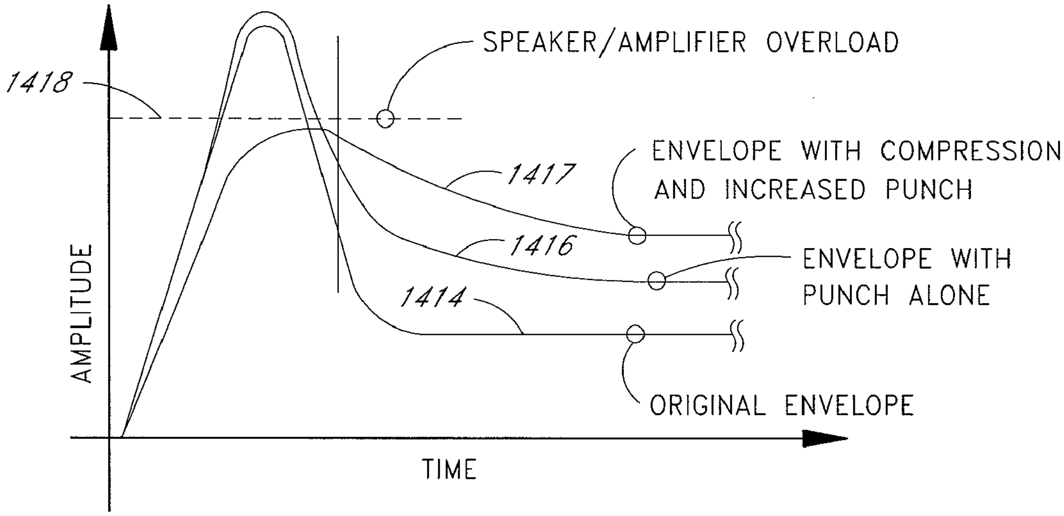
FIG. 14 is a time-domain plot showing the effect of the peak compressor on an envelope with a fast attack.

FIG. 14 is a time-domain plot showing the effect of the peak compressor on an envelope with an initial pulse of relatively high amplitude. FIG. 14 shows a time-domain plot of an input envelope 1414 having an initial large amplitude pulse followed by a longer period of lower amplitude signal. An output envelope 1416 shows the effect of the bass punch unit 1120 on the input envelope 1414 (without the peak compressor 1302). An output envelope 1417 shows the effect of passing the input signal 1414 through both the peak compressor 1302 and the punch unit 1120.

As shown in FIG. 14, assuming the amplitude of the input signal 1414 is sufficient to overdrive the amplifier or loudspeaker, the bass punch unit does not limit the maximum amplitude of the input signal 1414 and thus the output signal 1416 is also sufficient to overdrive the amplifier or loudspeaker.

The pulse compression unit 1302 used in connection with the signal 1417, however, compresses (reduces the amplitude of) large amplitude pulses. The compression unit 1302 detects the large amplitude excursion of the input signal 1414 and compresses (reduces) the maximum amplitude so that the output signal 1417 is less likely to overdrive the amplifier or loudspeaker.

Since the compression unit 1302 reduces the maximum amplitude of the signal, it is possible to increase the gain provided by the punch unit 1120 without significantly reducing the probability that the output signal 1417 will overdrive the amplifier or loudspeaker. The signal 1417 corresponds to an embodiment where the gain of the bass punch unit 1120 has been increased. Thus, during the long decay portion, the signal 1417 has a larger amplitude than the curve 1416.

As described above, the energy in the signals 1414, 1416, and 1417 is proportional to the area under the curve representing each signal. The signal 1417 has more energy because, even though it has a smaller maximum amplitude, there is more area under the curve representing the signal 1417 than either of the signals 1414 or 1416. Since the signal 1417 contains more energy, a listener will perceive more bass in the signal 1417.

Thus, the use of the peak compressor in combination with the bass punch unit 1120 allows the bass enhancement system to provide more energy in the bass signal, while reducing the likelihood that the enhanced bass signal will overdrive the amplifier or loudspeaker.

The present invention also provides a method and system that improves the realism of sound (especially the horizontal aspects of the sound stage) with a unique differential perspective correction system. Generally speaking, the differential perspective correction apparatus receives two input signals, a left input signal and a right input signal, and in turn, generates two enhanced output signals, a left output signal and a right output signal as shown in connection with FIG. 10.

The left and right input signals are processed collectively to provide a pair of spatially corrected left and right output signals. In particular, one embodiment equalizes the differences which exist between the two input signals in a manner which broadens and enhances the sound perceived by the listener. In addition, one embodiment adjusts the level of the sound which is common to both input signals so as to reduce clipping. Advantageously, one embodiment achieves sound enhancement with a simplified, low-cost, and easy-to-manufacture circuit which does not require separate circuits to process the common and differential signals as shown in FIG. 10.

Although some embodiments are described herein with reference to various sound enhancement system, the invention is not so limited, and can be used in a variety of other contexts in which it is desirable to adapt different embodiments of the sound enhancement system to different situations.

Figure 15:
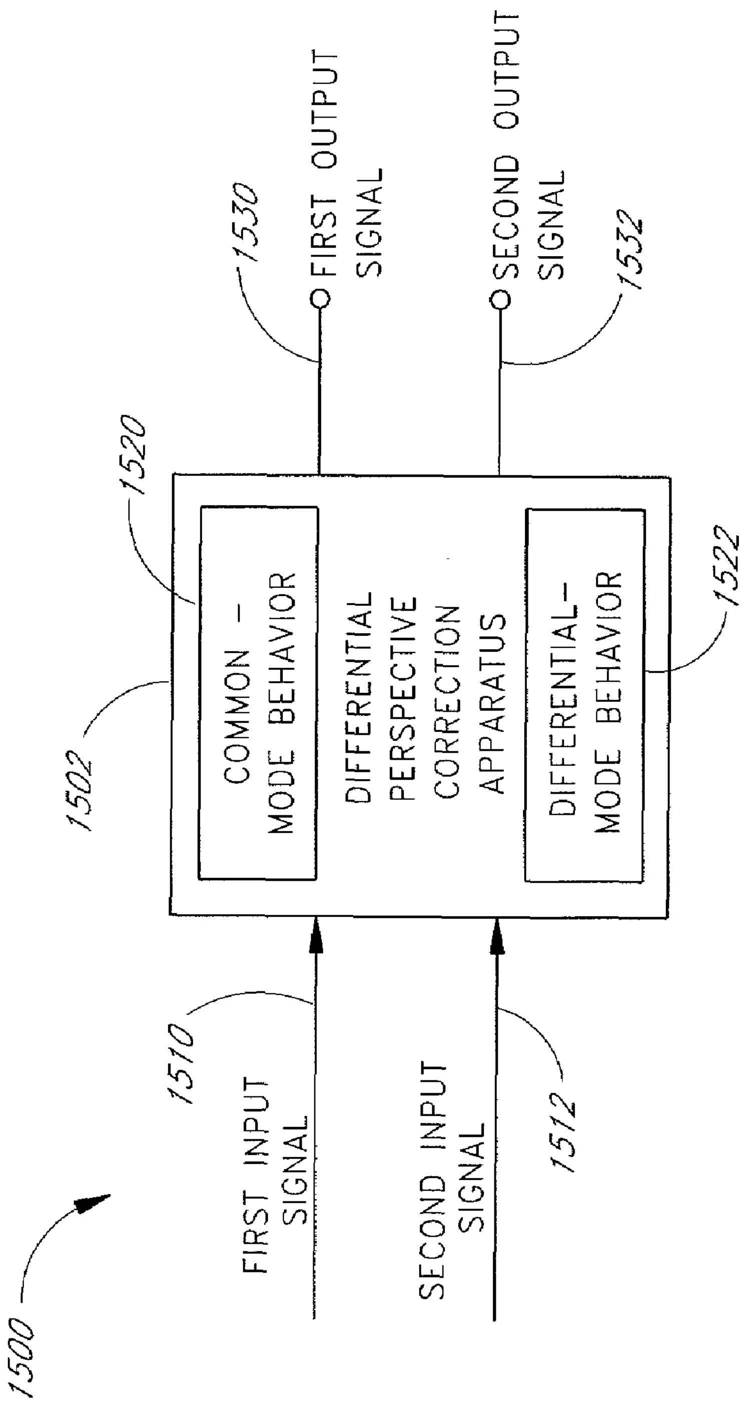
FIG. 15 is a conceptual block diagram of a stereo image (differential perspective) correction system.

FIG. 15 is a block diagram 1500 of a differential perspective correction apparatus 1502 from a first input signal 1510 and a second input signal 1512. In one embodiment the first and second input signals 1510 and 1512 are stereo signals; however, the first and second input signals 1510 and 1512 need not be stereo signals and can include a wide range of audio signals. As explained in more detail below, the differential perspective correction apparatus 1502 modifies the audio sound information which is common to both the first and second input signals 1510 and 1512 in a different manner than the audio sound information which is not common to both the first and second input signals 1510 and 1512.

The audio information which is common to both the first and second input signals 1510 and 1512 is referred to as the common-mode information, or the common-mode signal (not shown). In one embodiment, the common-mode signal does not exist as a discrete signal. Accordingly, the term common-mode signal is used throughout this detailed description to conceptually refer the audio information which exist in both the first and second input signals 1510 and 1512 at any instant in time.

The adjustment of the common-mode signal is shown conceptually in the common-mode behavior block 1520. The common-mode behavior block 1520 represents the alteration of the common-mode signal. One embodiment reduces the amplitude of the frequencies in the common-mode signal in order to reduce the clipping, which may result from high-amplitude input signals.

In contrast, the audio information which is not common to both the first and second input signals 1510 and 1512 is referred to as the differential information or the differential signal (not shown). In one embodiment, the differential signal is not a discrete signal, rather throughout this detailed description, the differential signal refers to the audio information which represents the difference between the first and second input signals 1510 and 1512.

The modification of the differential signal is shown conceptually in the differential-mode behavior block 1522. As discussed in more detail below, the differential perspective correction apparatus 1502 equalizes selected frequency bands in the differential signal. That is, one embodiment equalizes the audio information in the differential signal in a different manner than the audio information in the common-mode signal.

Furthermore, while the common-mode behavior block 1520 and the differential-mode behavior block 1522 are represented conceptually as separate blocks, one embodiment performs these functions with a single, uniquely adapted system. Thus, one embodiment processes both the common-mode and differential audio information simultaneously. Advantageously, one embodiment does not require the complicated circuitry to separate the audio input signals into discrete common-mode and differential signals. In addition, one embodiment does not require a mixer which then recombines the processed common-mode signals and the processed differential signals to generate a set of enhanced output signals.

Figure 16:
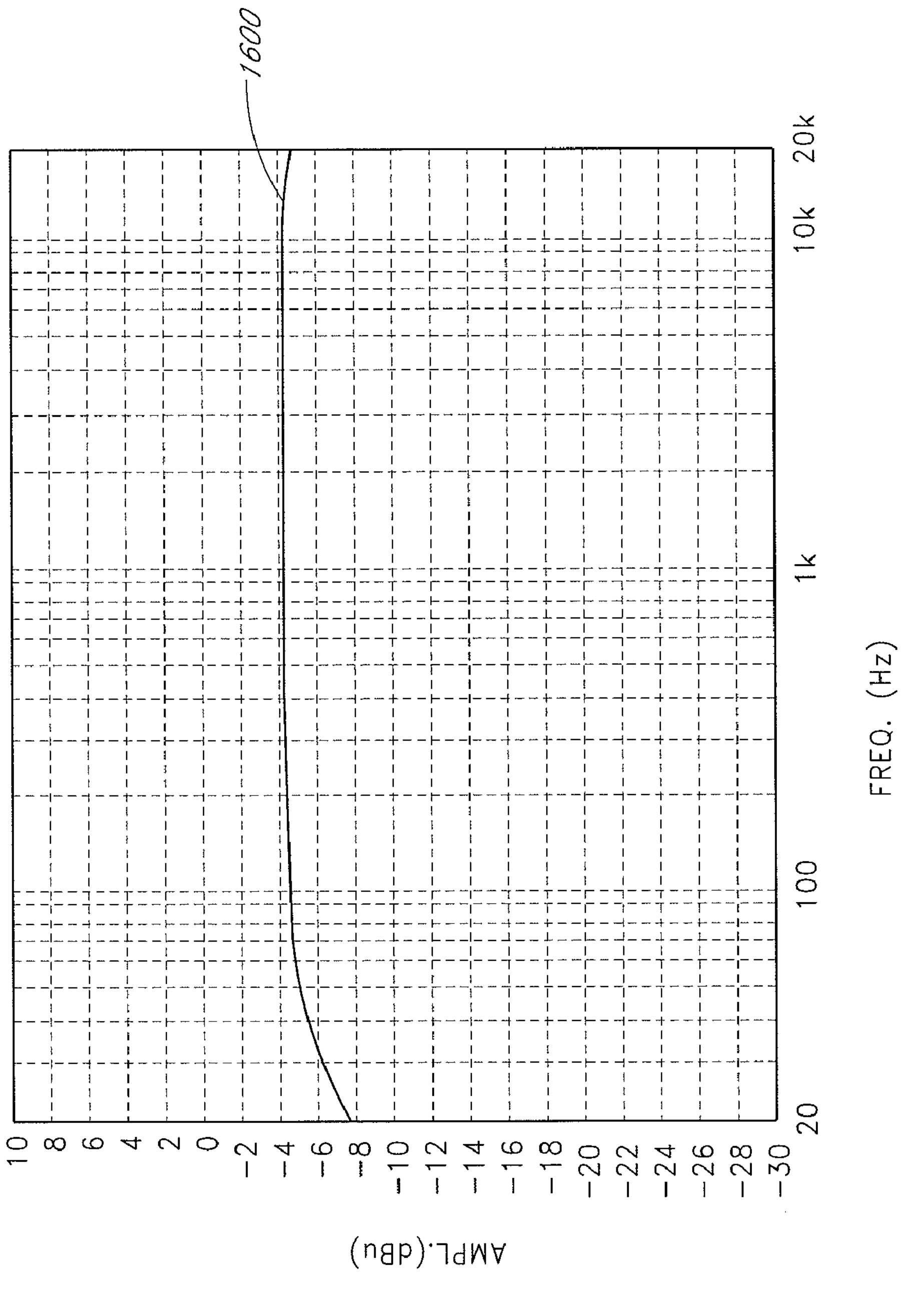
FIG. 16 illustrates a graphical representation of the common-mode gain of the differential perspective correction system.

FIG. 16 is an amplitude-versus-frequency chart, which illustrates the common-mode gain at both the left and right output terminals 1530 and 1532. The common-mode gain is represented with a first common-mode gain curve 1600. As shown in the common-mode gain curve 1600, the frequencies below approximately 130 hertz (Hz) are de-emphasized more than the frequencies above approximately 130 Hz.

Figure 17:
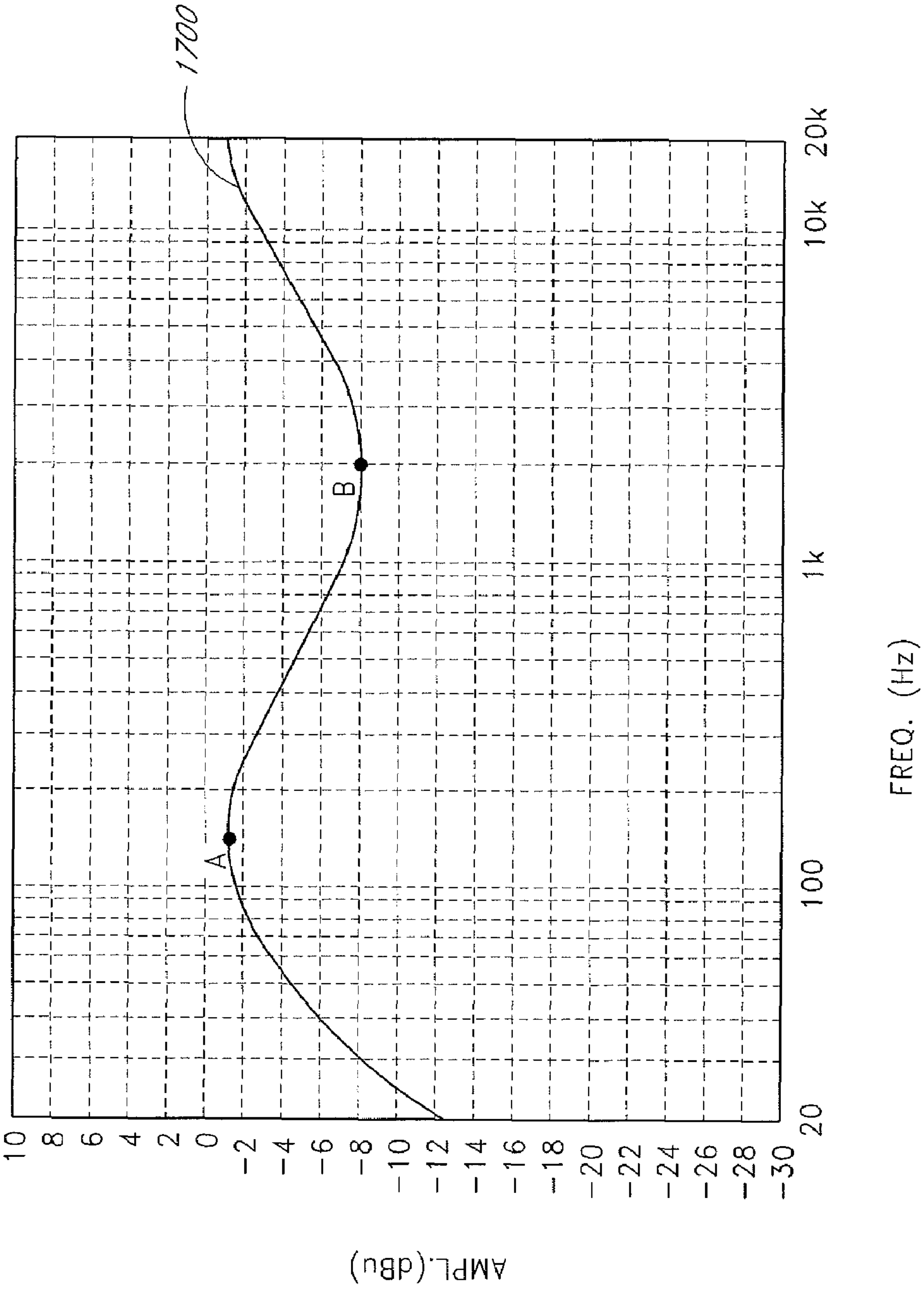
FIG. 17 is a graphical representation of the overall differential signal equalization curve of the differential perspective correction system.

FIG. 17 illustrates the overall correction curve 1700 generated by the combination of the first and second cross-over networks 1520, and 1522. The approximate relative gain values of the various frequencies within the overall correction curve 1700 can be measured against a zero (0) dB reference.

With such a reference, the overall correction curve 1700 shows two turning points labeled as point A and point B. At point A, which in one embodiment is approximately 170 Hz, the slope of the correction curve changes from a positive value to a negative value. At point B, which in one embodiment is approximately 2 kHz, the slope of the correction curve changes from a negative value to a positive value.

Thus, the frequencies below approximately 170 Hz are de-emphasized relative to the frequencies near 170 Hz. In particular, below 170 Hz, the gain of the overall correction curve 1700 decreases at a rate of approximately 6 dB per octave. This de-emphasis of signal frequencies below 170 Hz prevents the over-emphasis of very low, (i.e. bass) frequencies. With many audio reproduction systems, over emphasizing audio signals in this low-frequency range relative to the higher frequencies can create an unpleasurable and unrealistic sound image having too much bass response. Furthermore, over emphasizing these frequencies may damage a variety of audio components including the loudspeakers.

Between point A and point B, the slope of one overall correction curve is negative. That is, the frequencies between approximately 170 Hz and approximately 2 kHz are de-emphasized relative to the frequencies near 170 Hz. Thus, the gain associated with the frequencies between point A and point B decrease at variable rates towards the maximum-equalization point of −8 dB at approximately 2 kHz.

Above 2 kHz the gain increases, at variable rates, up to approximately 20 kHz, i.e., approximately the highest frequency audible to the human ear. That is, the frequencies above approximately 2 kHz are emphasized relative to the frequencies near 2 kHz. Thus, the gain associated with the frequencies above point B increases at variable rates towards 20 kHz.

These relative gain and frequency values are merely design objectives and the actual figures will likely vary from system to system. Furthermore, the gain and frequency values may be varied based on the type of sound or upon user preferences without departing from the spirit of the invention. For example, varying the number of the cross-over networks and varying the resister and capacitor values within each cross-over network allows the overall perspective correction curve 1700 be tailored to the type of sound reproduced.

The selective equalization of the differential signal enhances ambient or reverberant sound effects present in the differential signal. As discussed above, the frequencies in the differential signal are readily perceived in a live sound stage at the appropriate level. Unfortunately, in the playback of a recorded performance the sound image does not provide the same 360-degree effect of a live performance. However, by equalizing the frequencies of the differential signal with the differential perspective correction apparatus 1502, a projected sound image can be broadened significantly so as to reproduce the live performance experience with a pair of loudspeakers placed in front of the listener.

Equalization of the differential signal in accordance with the overall correction curve 1700 de-emphasizes the signal components of statistically lower intensity relative to the higher-intensity signal components. The higher-intensity differential signal components of a typical audio signal are found in a mid-range of frequencies between approximately 2 kHz to 4 kHz. In this range of frequencies, the human ear has a heightened sensitivity. Accordingly, the enhanced left and right output signals produce a much improved audio effect.

The number of cross-over networks and the components within the cross-over networks can be varied in other embodiments to simulate what are called head related transfer functions (HRTF). Head related transfer functions describe different signal equalizing techniques for adjusting the sound produced by a pair of loudspeakers so as to account for the time it takes for the sound to be perceived by the left and right ears. Advantageously, an immersive sound effect can be positioned by applying HRTF-based transfer functions to the differential signal so as to create a fully immersive positional sound field.

Examples of HRTF transfer functions which can be used to achieve a certain perceived azimuth are described in the article by E. A. B. Shaw entitled “Transformation of Sound Pressure Level From the Free Field to the Eardrum in the Horizontal Plane”, J.Acoust.Soc.Am., Vol. 106, No. 6, December 1974, and in the article by S. Mehrgardt and V. Mellert entitled “Transformation Characteristics of the External Human Ear”, J.Acoust.Soc.Am., Vol. 61, No. 6, June 1977, both of which are incorporated herein by reference as though fully set forth.

In addition to music, Internet Audio is extensively utilized for transmission of voice. Often times, voice is even more aggressively compressed than music resulting in poor reproduced voice quality. By combining voice processing technologies, such as VIP as disclosed in U.S. Pat. No. 5,459,813, and incorporated herein by reference, and TruBass, an enhancement to voice can be obtained, called “WOWvoice”, that is similar to the enhancement to music provided by WOW. As with WOW, “WOWVoice” can be implemented as a client-side technology that is installed in the user's computer. Exactly the same means for licensing and control discussed above can be directly applied to WOWVoice.

WOWvoice can be optimized for various applications to maximize the perceived enhancement with various bit rates and sample rates. In one embodiment, WOWvoice includes means to restore the full frequency spectrum to voice signals from a source that has a limited frequency response. In one embodiment, WOWvoice can also combine a synthesized Mono to 3D process to create a more natural voice ambiance.

One skilled in the art will recognize that these features, and thus the scope of the present invention, should be interpreted in light of the following claims and any equivalents thereto.

What is claimed is:

1. A method of delivering a surround-sound audio signal over the Internet to a client using Internet stereo sound streaming techniques, the method comprising:

providing a 5.1 channel audio input signal at an Internet broadcast location;

encoding the 5.1 channel audio input signal into two channels of transmit audio;

converting the two channels of transmit audio into a streaming format for transmission over the Internet;

transmitting the streaming format to a client location;

reconverting the streaming format into two channels of receive audio;

decoding the two channels of receive audio into a 5.1 channel audio output signal;

processing the 5.1 channel audio output signal into a two-channel audio output signal, wherein the two-channel audio output signal is configured to simulate 5.1 channel audio when played on a pair of loudspeakers; and enhancing the two-channel audio output signal for playback by the client, said enhancing comprising:

correcting a perceived height of an apparent sound stage associated with the two-channel audio output signal;

enhancing a bass response associated with the two-channel audio output signal comprising:

filtering the two-channel audio output signal at a first frequency with a first band pass filter;

filtering the two-channel audio output signal at a second frequency with at least a second band pass filter, wherein the second frequency is different than the first frequency; and filtering the two-channel audio output signal at a third frequency with a third band pass filter, wherein the third frequency is different than the first and second frequencies; and correcting a perceived width of the apparent sound stage associated with the two-channel audio output signal.

2. The method of claim 1 wherein the client represents an individual personal computer user.

3. The method of claim 1 wherein encoding comprises encoding using a Circle Surround 5.1 encoder.

4. The method of claim 1 wherein decoding comprises decoding using a Circle Surround 5.1 decoder.

5. The method of claim 1 wherein providing a 5.1 channel audio input signal comprises providing a Circle Surround encoded 5.1 audio input signal.

6. The method of claim 1 further comprising:

determining whether the Internet location is a licensed broadcast location prior to processing the 5.1 channel audio output signal into the two-channel audio output signal and prior to enhancing the two-channel audio output signal; and permitting the processing of the 5.1 channel audio output signal into the two-channel audio output signal and the enhancing of the two-channel audio output signal when the Internet location is a licensed broadcast location.

7. The method of claim 1 further comprising downloading to the client location a browser interface comprising audio enhancement.

8. An apparatus for delivering a surround-sound audio signal over the Internet to a client using Internet stereo sound streaming techniques, the apparatus comprising:

an encoder to encode a 5.1 channel audio input signal at an Internet broadcast location into two channels of transmit audio;

a first converter to convert the two channels of transmit audio into a streaming format for transmission over the Internet;

a transmitter to transmit the streaming format to a client location;

a second converter to reconvert the streaming format into two channels of receive audio;

a decoder to decode the two channels of receive audio into a 5.1 channel audio output signal;

a processor to process the 5.1 channel audio output signal into a two-channel audio output signal, wherein the two-channel audio output signal is configured to simulate 5.1 channel audio when played on a pair of loudspeakers;

a sound enhancement system to enhance the two-channel audio output signal for playback by the client, the sound enhancement system comprising:

an image correction module to correct a perceived height of an apparent sound stage associated with the two-channel audio output signal;

a bass enhancement module to enhance a bass response associated with the two-channel audio output signal comprising:

a first band pass filter that filters the two-channel audio output signal at a first frequency;

a second band pass filter that filters the two-channel audio output signal at a second frequency, wherein the second frequency is different than the first frequency; and a third band pass filter that filters the two-channel audio output signal at a third frequency, wherein the third frequency is different than the first and second frequencies; and an image enhancement module to enhance a perceived width of the apparent sound stage associated with the two-channel audio output signal.

9. The apparatus of claim 8 wherein the client represents an individual personal computer user.

10. The apparatus of claim 8 wherein the encoder comprises a Circle Surround 5.1 encoder.

11. The apparatus of claim 8 wherein the decoder comprises a Circle Surround 5.1 decoder.

12. The apparatus of claim 8 wherein the 5.1 channel audio input signal comprises a Circle Surround encoded 5.1 audio input signal.

13. The apparatus of claim 8 further comprising a licensed broadcast location, wherein the 5.1 channel audio output signal is processed into the two-channel audio output signal and the two-channel audio output signal is enhanced when the Internet location is a licensed broadcast location.

14. The apparatus of claim 8 further comprising a browser interface comprising audio enhancement at the client location.

15. An apparatus for delivering a surround-sound audio signal over the Internet to a client using Internet stereo sound streaming techniques, the apparatus comprising:

means for encoding a 5.1 channel audio input signal into two channels of transmit audio;

means for converting the two channels of transmit audio into a streaming format for transmission over the Internet;

means for transmitting the streaming format to a client location;

means for reconverting the streaming format into two channels of receive audio;

means for decoding the two channels of receive audio into a 5.1 channel audio output signal;

means for processing the 5.1 channel audio output signal into a two-channel audio output signal, wherein the two-channel audio output signal is configured to simulate 5.1 channel audio when played on a pair of loudspeakers; and means for enhancing the two-channel audio output signal for playback by the client, said enhancing comprising:

means for correcting a perceived height of an apparent sound stage associated with the two-channel audio output signal;

means for enhancing a bass response associated with the two-channel audio output signal comprising:

means for filtering the two-channel audio output at a first frequency;

means for filtering the two-channel audio output at a second frequency, wherein the second frequency is different than the first frequency; and means for filtering the two-channel audio output at a third frequency, wherein the third frequency is different than the first and second frequencies; and means for correcting a perceived width of the apparent sound stage associated with the two-channel audio output signal.

16. The apparatus of claim 15 wherein the client represents an individual personal computer user.

17. The apparatus of claim 15 wherein the means for encoding comprises a means for Circle Surround 5.1 encoding.

18. The apparatus of claim 15 wherein the means for decoding comprises a means for Circle Surround 5.1 decoding.

19. The apparatus of claim 15 wherein the 5.1 channel audio input signal comprises a Circle Surround encoded 5.1 audio input signal.

20. The apparatus of claim 15 further comprising:

a means for determining whether the Internet location is a licensed broadcast location prior to processing the 5.1 channel audio output signal into the two-channel audio output signal and prior to enhancing the two-channel audio output signal; and a means for permitting the processing of the 5.1 channel audio output signal into the two-channel audio output signal and the enhancing of the two-channel audio output signal when the Internet location is a licensed broadcast location.

* * * * *

UNITED STATES PATENT AND TRADEMARK OFFICE

CERTIFICATE OF CORRECTION

PATENT NO. : 7,277,767 B2 Page 1 of 1
APPLICATION NO. : 09/734475
DATED : October 2, 2007
INVENTOR(S) : Yuen et al.

It is certified that error appears in the above-identified patent and that said Letters Patent is hereby corrected as shown below:

On page 2, in the first column, at the first line, please delete “3,249,698” and insert -- 3,249,696 --, therefor.

At column 15, line 16, please delete “FIG. 60.” and insert -- FIG. 6C. --, therefor.

At column 16, line 28, please delete “khz,” and insert -- kHz, --, therefor.

At column 16, line 49, please delete “filly” and insert -- fully --, therefor.

At column 24, line 50, please delete “WOWvoice”,” and insert -- WOWVoice --, therefor.

At column 24, line 56, please delete “WOWvoice” and insert -- WOWVoice --, therefor.

At column 24, line 58, please delete “WOWvoice” and insert -- WOWVoice --, therefor.

At column 24, line 61, please delete “WOWvoice” and insert -- WOWVoice --, therefor.

Signed and Sealed this

First Day of July, 2008

JON W. DUDAS
*Director of the United States Patent and Trademark Office*